United States Patent [19]
Brown et al.

[11] 3,938,096
[45] Feb. 10, 1976

[54] APPARATUS FOR DEVELOPING AN ADDRESS OF A SEGMENT WITHIN MAIN MEMORY AND AN ABSOLUTE ADDRESS OF AN OPERAND WITHIN THE SEGMENT

[75] Inventors: James L. Brown, Chelmsford; Richard P. Wilder, N. Billerica, both of Mass.; Richard P. Kelly, Nashua, N.H.

[73] Assignee: Honeywell Information Systems Inc., Waltham, Mass.

[22] Filed: Dec. 17, 1973

[21] Appl. No.: 425,356

[52] U.S. Cl. ............................ 340/172.5
[51] Int. Cl.[2] ........................... G06F 9/00
[58] Field of Search .................. 340/172.5

[56] References Cited
UNITED STATES PATENTS

| | | | |
|---|---|---|---|
| 3,685,020 | 8/1972 | Meade | 340/172.5 |
| 3,693,165 | 9/1972 | Reiley et al. | 340/172.5 |
| 3,699,533 | 10/1972 | Hunter | 340/172.5 |
| 3,701,984 | 10/1972 | Burns | 340/172.5 |
| 3,731,283 | 5/1973 | Carlson et al. | 340/172.5 |
| 3,764,996 | 10/1973 | Ross | 340/172.5 |
| 3,800,286 | 3/1974 | Brown et al. | 340/172.5 |

*Primary Examiner*—Leo H. Boudreau
*Attorney, Agent, or Firm*—Nicholas Prasinos; Ronald T. Reiling

[57] ABSTRACT

Computer addressing hardware and a method of address development which utilizes the concept of a segment as the unit of addressability is disclosed.

The fundamental vehicle for addressing is the segment wherein an address space is defined for a process and is included as part of the controlled information of the logical processor (the collection of hardware resources and control information necessary for the execution of a process.) The address space defines a predetermined number of different segments in which instructions can access operands. Within a segment, access is by relative location to the beginning of the segment, and is computed during address development. Any attempt to access information beyond the upper bound of the segment is detected by hardware and an exception condition occurs. An instruction may access an operand either directly or indirectly via a data descriptor, wherein an address syllable in the instruction is used for reference, and specifies whether reference is direct or indirection is to be preferred. The address syllable specifies a base register which defines the segment to be referenced and an offset within the segment. The address syllable also contains a displacement from this defined base. Address development hardware obtains the absolute address of the beginning of the segment, adds to this; the offset defined in the base registers, the displacement defined by the instructions, and if required the contents of an index register. This summation produces the required absolute address.

8 Claims, 29 Drawing Figures

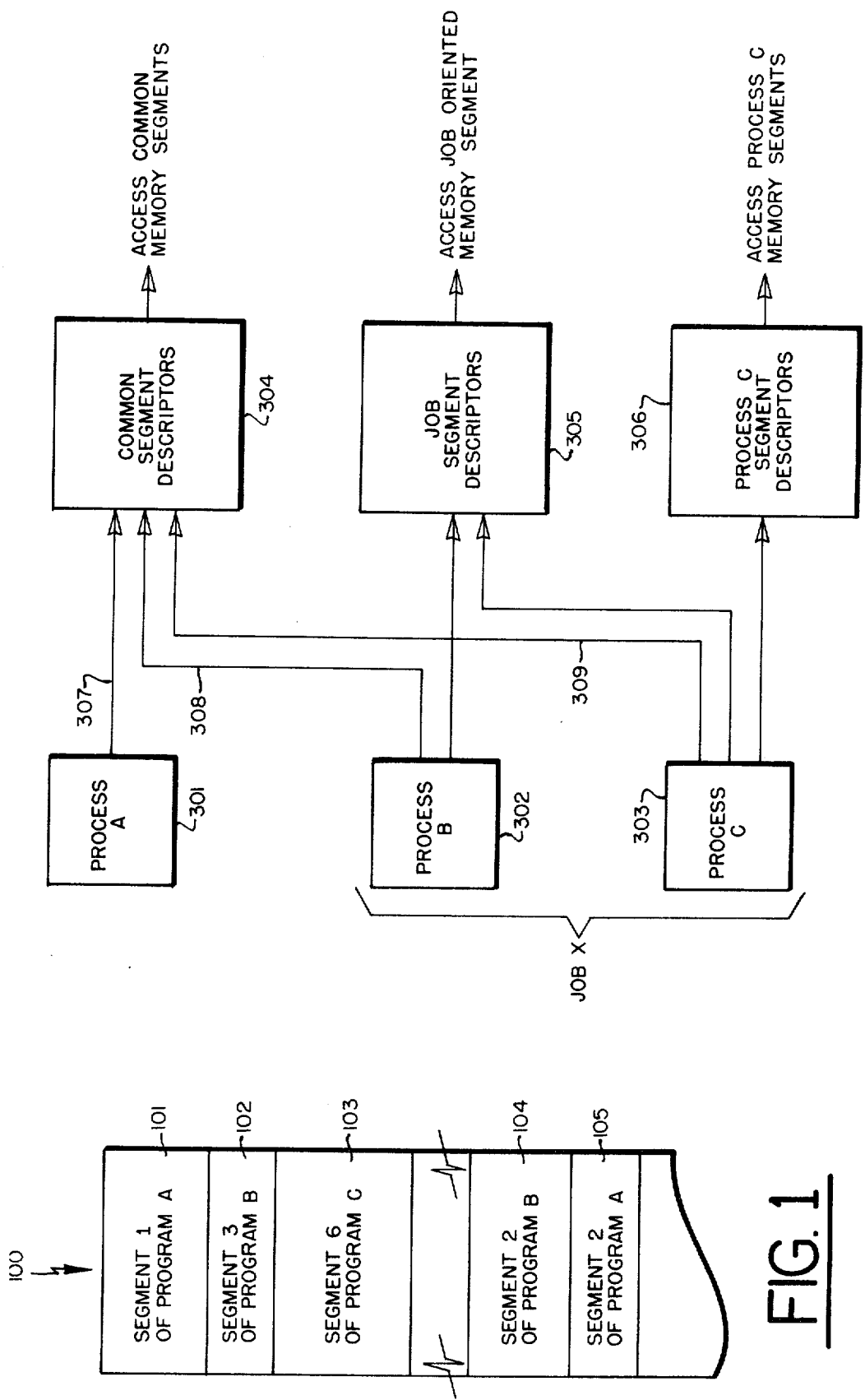

ITB CASE

ITS CASE

FIG. 2CDE
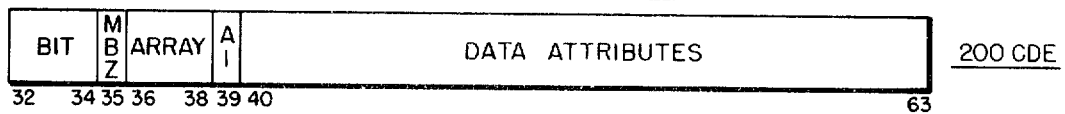
FIG. 2F
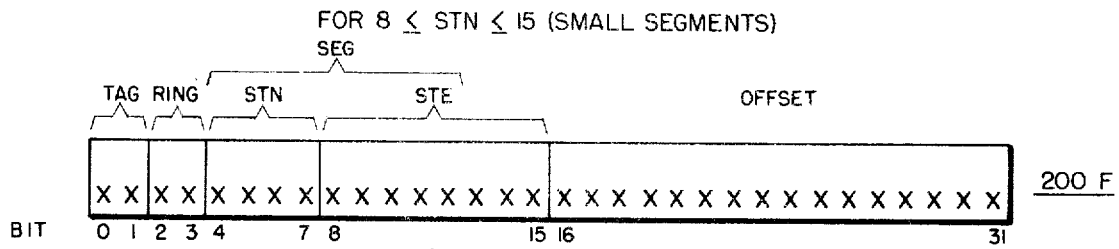
FIG. 2G
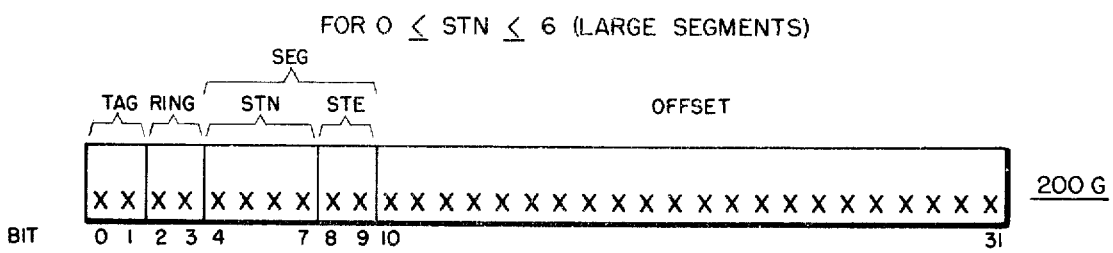
FIG. 2H
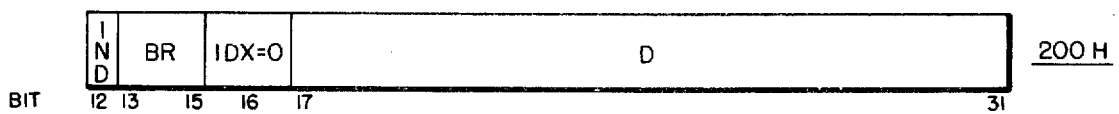
FIG. 2I
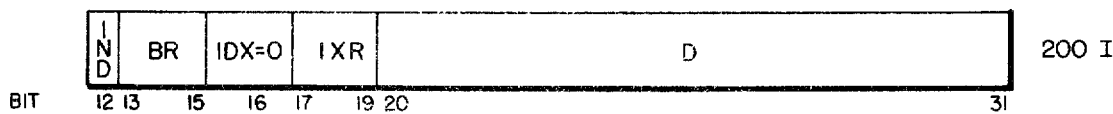

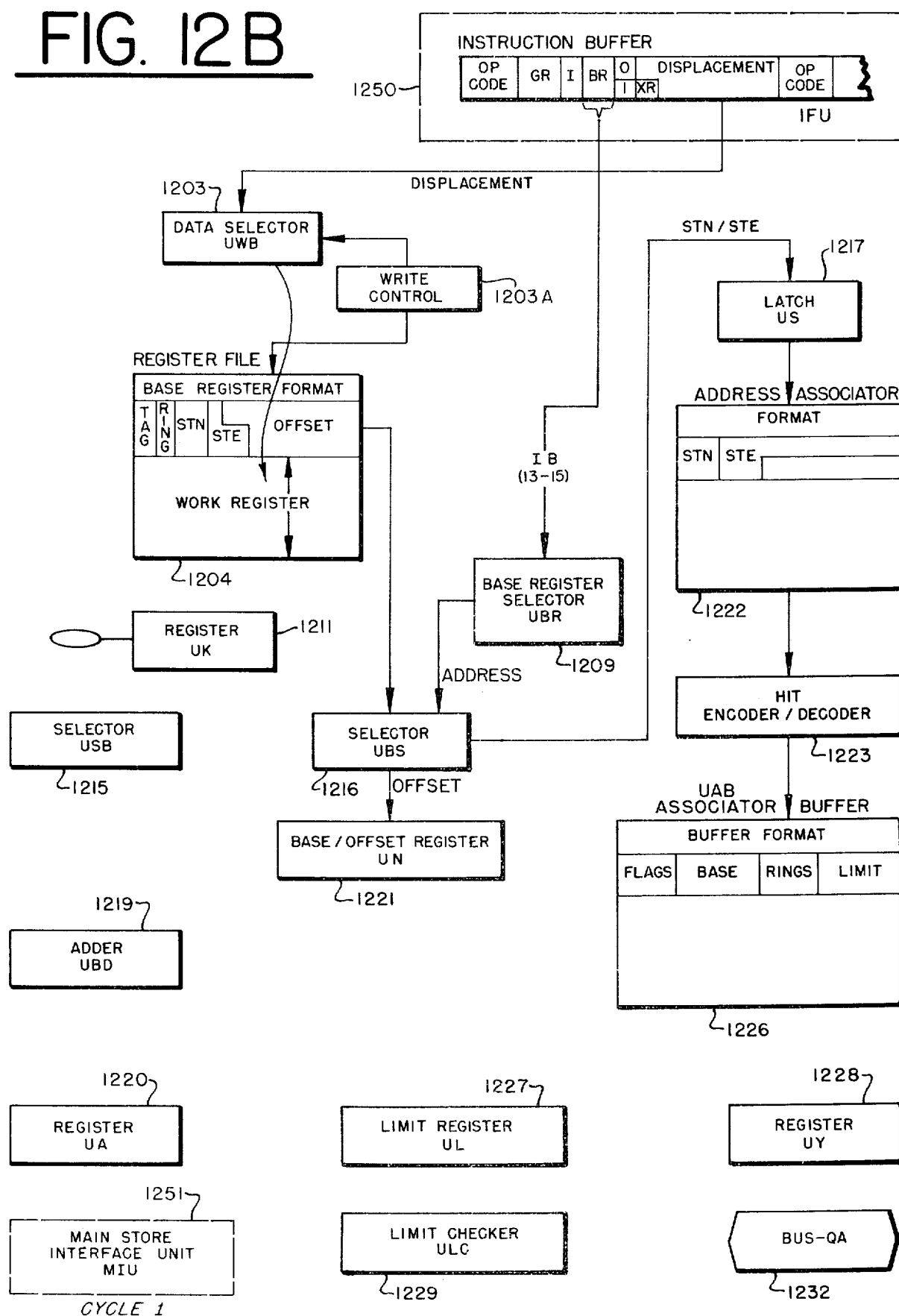

APPARATUS FOR DEVELOPING AN ADDRESS OF A SEGMENT WITHIN MAIN MEMORY AND AN ABSOLUTE ADDRESS OF AN OPERAND WITHIN THE SEGMENT

RELATED APPLICATIONS

The following applications are incorporated by reference to the instant application.

1. "Buffer Store" invented by J. L. Curley, T. J. Donahue, W. A. Martland and B. S. Franklin, filed on Oct. 5, 1972 having Ser. No. 295,301 and assigned to the same assignee named herein.

2. "Variable Masking for Segmented Memory" invented by Wallace A. Martland and John L. Curley, filed on Oct. 5, 1972 having Ser. No. 295,303 and assigned to the same assignee named herein.

3. "Override Hardware for Main Store Sequencer" invented by Thomas J. Donahue, filed on Oct. 5, 1972 having Ser. No. 295,418 and assigned to the same assignee named herein.

4. "Main Memory Sequencer" invented by T. J. Donahue, J. L. Curley, B. S. Franklin, W. A. Martland, and L. V. Cornaro, filed on Oct. 5, 1972 having Ser. No. 295,331 and assigned to the same assignee named herein.

5. "Main Memory Reconfiguration" invented by J. L. Curley, B. S. Franklin, W. A. Martland, T. J. Donahue, and L. V. Cornaro filed on Oct. 5, 1972 having Ser. No. 295,417 and assigned to the same assignee named herein.

6. "Address Development Technique Utilizing Content Addressable Memory" invented by James L. Brown and Richard P. Wilder, Jr., filed on 8/24/72 having Ser. No. 283,617 and, matured into U.S. Pat. No. 3,800,286 on 3/26/74.

BACKGROUND OF THE INVENTION

1. Field of the Invention

This invention relates generally to data processing systems and more particularly to address development hardware and techniques.

2. Description of the Prior Art

In the early days of computers an intimate knowledge of the structure and operating characteristics of the computer were essential in order to utilize it effectively and solve problems. The primary application of computers then was mathematical computation, with minimal utilization by business and government. Programs were written in the language of the computer, for esoteric applications and were generally of interest to the person generating the program or his organization. Moreover the programmer was generally the only person who could anticipate how the computer would react when his program was in the machine; hence his presence at the computer console was required during running of his program in order to correct for unexpected occurrences. During those early days standardization and documentation of programs was practically non-existent.

As the capabilities of the computer became recognized and more particularly with improvements in computer speeds and input/output equipment, and with the advent of high level languages such as FORTRAN and COBOL which permitted the writing of programs symbolically the range of computer applications was extended. Standardized programs under control of an operating system (control program) took over functions previously reserved by necessity for the programmer, and the concept of a single program on which a single processor computed for long periods of time without access to the outside world gave way to batch processing. The batch operating system permitted the grouping of a number of jobs for the purpose of compiling or assembling the source decks into object decks (i.e. translating the user program from symbolic language to machine language), loading and executing the user's programs. Since second generation computers were much faster than their earlier counterparts, the amount of "set up" time required to prepare a computer program for execution in a computer was disproportionately large in comparison to the actual execution time of the program. The batch operating system helped solve this problem. Moreover the batch operating system introduced the concept of a supervisor state and user or problem state for computer operation.

With the reduction of computer set-up time to a negligible percentage of computer run-time for a given job, computers became more attractive for data processing uses other than pure mathematical calculation uses.

However, with the increased usage of computers by business and government organizations there came an increased demand for greater efficiency and operating systems that provided all the services and control to permit jobs to be scheduled and executed in a multiprogramming environment; the third generation computer rose to meet the challenge.

In simple batched systems the important resource of random access memory (generally core memory, but more recently MOS-metal oxide semiconductor memory) was allocated to a single program, and proved to be wasteful of core memory whenever the program did not need the entire memory. One of the first problems of a multiprogramming scheme was the efficient utilization of main memory particularly when several system functions invoked the same procedure. As a first step core memory was partitioned which permitted multiple programs to reside in separate areas of core memory at the same time. However, since programs are rarely of the same size, overlapping of areas with concomitant overlay of one program by another was always a threat. To alleviate this situation nonoverlapping areas of the address space were allocated to each program. This technique partially solved the above problem of overlap but introduced the problem of fragmentation of core memory i.e. "holes" or unused portions of core memory which were too small for any other allocation and hence wasted that portion of core. A solution to the problem of fragmentation of core memory was to provide a relocation register to translate contiguous addresses in name space into contiguous addresses into memory space. This resulted in giving the system freedom in the assignment of physical memory locations and permitted in relocation of name space so as to condense the unused portions of physical main memory into one continuous part of core. Still there remained much inefficiency in the use of main memory because this constant reallocation of main memory was wasteful, and created severe penalties in supervision overhead particularly where many concurrent programs were continually changing their demands on main memory. The next step in the evolution of efficient memory utilization was the introduction of the concept of paging. Paging is a method of memory allocation wherein the name-space of program is subdivided into equal portions or pages, and physical main memory is subdivided into equal portions or blocks and wherein the page size is equal to the block size although the total name space need not be equal to the physical main memory. A block index is utilized to associate any particular block with any particular page, hence it is not necessary to relocate or move a page with each program demand. One free block is as good as another in which to assign a page since continuity in a program is obtained via the block index, and the probability is high that a free block can be found for a new page in main memory. Some computer systems that utilize paging are the Atlas Computer of Manchester University, XDS940, and Honeywell Information Systems HIS 645.

Although the paging technique solved the problem of allocating main memory space among several programs, it did not solve the problem of allocating addresses in name space among several programs nor the problem of protection of information in main memory. A. W. Holt first suggested the concept of segmentation (Program Organization and Record Keeping for Dynamic Storage Allocation, Information Processing 62, North-Holland Publishing Co., Amsterdam, 1962, p. 539.) and J. B. Dennis further developed the concept of segmentation in order to solve problems pertaining to the naming and referencing of information (Segmentation of the Design of Multiprogrammed Computer Systems, Journal of the Association for Computing Machinery, Vol. 12, No. 4, October 1965, pp. 589–602.) Early uses of the segmentation concept were in the Burroughs B5000 computer, and also in the Honeywell Information Systems HIS 645 utilizing the Multics operating system.

In the segmentation scheme a segment is defined as an ordered set of words which are referenced by a segment name that distinguishes the segment from all other segments, and by an integer address that is utilized to select a particular member from the ordered set of uses in the segment. The segment is the unit of user sharing, carries a symbolic name, has a set of associated access attributes which describes, among other things, the function in which each user is permitted to reference the contained procedures and/or data. The segment is permitted to grow and shrink and is directly addressable in programs. The segment is thought of as an extention of the notion of file found in traditional systems; however, the file is not directly addressable nor can files copied into core be directly shared by programs of other users.

The segmentation concept is a reasonable solution to the problem of naming, addressing, allocating and protecting information in main memory such that:

1. A computation should have the use of a name space sufficiently large that all information it references may be assigned unique names, and such that reallocation of information within its name space is never necessary.

2. Data objects of a computation should be expandable without requiring a reallocation of name space.

3. Information referenced in common by several computations should have the same name for all computations that reference it.

4. A protection mechanism should operate in name space to permit access to information by a computation only in an authorized manner. (Jack B. Dennis, Segmentation and the Design of Multiprogrammed Computer Systems, Journal of the Association of Computing Machinery, Vol. 12, No. 4, October 1965, pp. 589–602.)

Whereas some computer systems referenced supra utilize some of the concepts of paging, blocking and segmentation to improve efficiency of memory utilization, the use of these techniques have not been fully exploited being implemented generally in systems software with some minimum of hardware. For example the HIS 645, utilizing some of the concepts of paging and segmentation, is an upgraded HIS 635 which was modified to include multiple memory modules, multiple input/output controllers, multiprocessors, and a series of special registers called attachment registers. Together with a virtual memory concept and the MULTICS software package the HIS 645 computer incorporates some of the concepts supra.

As the fourth generation computer system begins to take shape it will undoubtedly exhibit the best characteristics of the third generation computer system, such as paging and segmentation. What is needed, however, is an improved version of segmentation with improved segmented addressing techniques and segmented addressing hardware.

OBJECTS

It is an object, therefore, of the instant invention to provide improved segmented addressing hardware.

It is another object of the invention to provide an improved computer addressing method and hardware wherein the segment serves as the unit of addressability.

It is still a further object of the invention to provide computer addressing hardware wherein the levels of direct access is provided at the level of segments private to a process.

Another object of the invention is to provide computer addressing hardware wherein the level of direct access is provided at a level of the segments shared among processes of a process group.

Yet another object of the instant invention is to provide computer addressing hardware wherein the level of direct access is at the level of segments shared by all processes.

Yet still another object of the instant invention is to provide computer addressing hardware wherein sharing of processes is through indirect access.

Other objects of the invention will become apparent from the description of a preferred embodiment of the invention when read in conjunction with the drawings contained herewith.

SUMMARY OF THE INVENTION

The foregoing objects of the instant invention are achieved by providing addressing hardware and an address development method which operates on a number of address elements to compute an absolute address which is used to refer to a byte location in core.

A number of modes of address development are available, and hardware checks are carried out during address development to insure that the absolute address obtained is the one referenced.

The fundamental vehicle for addressing is the segment. An address space is defined for a process comprising the set of logical addresses that the hardware is permitted to transform into absolute addresses during the execution of the process (A logical address typically consists of a pair $(s,d)$ where "$s$" is the segment number, and "$d$" the displacement.) The hardware is given tables, the segment tables, defining the address space of the process. A segment table (st) contains one entry, or segment descriptor, for each segment. Each segment descriptor contains all attributes of the segment, among which are the absolute core address of the segment and the length of the segment.

An instruction may access an operand either directly or indirectly via a data descriptor wherein an address syllable in the instruction is used for reference, and specifies whether reference is direct or indirect, and moreover specifies a base register which defines the segment to be referenced and also defines an offset within the segment. The address syllable further contains a displacement from the defined base.

Address development hardware obtains the absolute address of the beginning of the segment, adds to this, the offset defined in the above registers, the displacement defined by the instruction and, if required, the contents of an index register. This summation produces the required absolute address.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description taken in conjunction with the drawings in which:

FIG. 1 is a schematic diagram of a number of segments in main memory.

FIGS. 2A–2M are schematic diagrams of various novel hardware structures utilized in the invention.

FIGS. 2A–2B are segment descriptors.

FIGS. 2C–2E are data descriptors while

FIG.2CDE is an extended data descriptor.

FIGS. 2F–2G are base registers.

FIGS. 2H–2I are address syllables.

FIGS. 2J–2K are effective address elements.

FIG. 2L is a typical address-space word ASW.

FIG. 2M is a typical segment table word, STW.

FIG. 3 is a schematic diagram of segment descriptor sharing and usage by various processes.

FIGS. 12B–12E show the various states of the segmented addressing hardware during various cycles.

DETAILED DESCRIPTION OF THE INVENTION

Figure 2A:
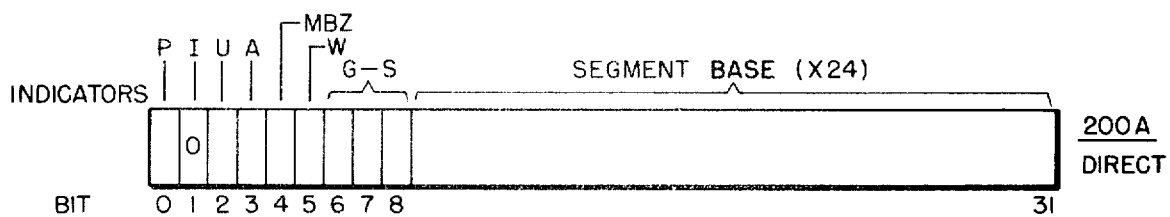

General:

In earlier less sophisticated computer systems, programs were run one at a time, with each program having access to all memory resources. In most instances, the allocation of memory was very straightforward. However, in instances where the program exceeded the available memory, the programmer was required to partition his program and/or data and control the loading of such partitions.

In a multiprogramming environment, there are many programs in memory at any given time. Therefore, the problem of absolute memory allocation, as discussed previously, is enormous. To ease the problem, a system of dynamically allocating memory space is assumed by a combination of the operating system and the hardware. Because of the random size of program, this system allocates memory into variable size segments and has facilities to restructure the memory allocation within the course of a program run. Thus a program may have a number of memory segments allocated to it that are not in consecutive areas of memory (see FIG. 1.) Referring to FIG. 1 the random access memory 100 of a general purpose computer is shown with 5 different segments of 3 different programs A, B, and C stored therein. Segment 1 of program A is stored in a portion 101 of main memory 100, a segment 3 of program B is stored in a portion 102 of main memory 100, a segment 6 of program C is stored in a portion 103 of main memory, a segment 2 of program B is stored in a portion 104 of main memory, whereas a segment 2 of program A is stored in a portion 105 of main memory. Other portions to the extent of the total capacity of main memory may also be stored in various segments of different programs and/or data.

This procedure would normally present a problem, in that all memory addresses in a program would have to be modified whenever a program or program segment was reallocated. However, to alleviate this problem, the invention utilizes a technique wherein addresses contained in the user's program are logical rather than absolute main memory addresses. (See Glossary of Terms for definition). These logical addresses are then used to develop absolute main memory addresses. Using this technique, user programs may be written without regard to absolute main memory locations.

Figure 2B:
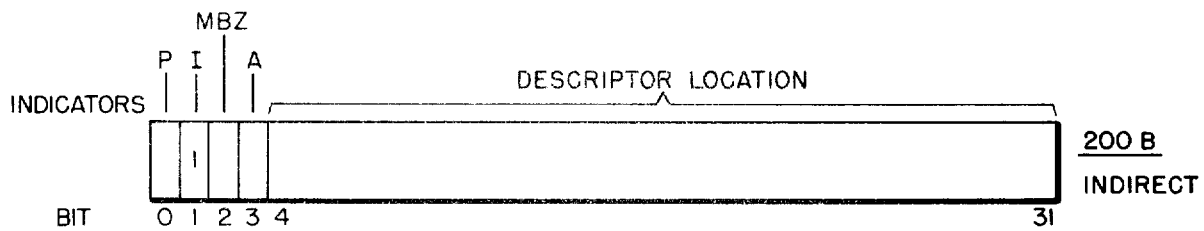

This memory allocation system permits each process (see Glossary of Terms for definition) to access its own or related memory segments via a system of segment descriptors. The format of a segment descriptor is as shown on FIGS. 2A and 2B. Referring to FIGS. 2A and 2B there is shown the format of a direct segment descriptor 200A and an indirect segment descriptor 200B. The direct segment descriptor describes and points to a segment whereas the indirect segment descriptor points to another segment descriptor. Referring to FIG. 2A a presence indicator P is shown at bit position 0. The presence indicator P is a one-bit P-field which when set to "1" indicates that a segment is defined in main storage for the segment number to which that descriptor corresponds. If the P-field is cleared to "0", no segment is defined and the reference to the segment descriptor causes a missing segment exception. The one-bit I-field at bit position one is an indirect bit I and indicates that the descriptor contains the absolute address of another segment descriptor, not the address of the base of a segment. The access field of the indirect descriptor I is utilized by access-protection tests (which is the subject of another invention) in place of the access field of the segment descriptor to which the indirect descriptor points. A "used-flag" U field in bit position 2 indicates whether or not the segment has been accessed. If the flag U is set to "0" the segment has not been accessed whereas if the flag U is set to "1" it indicates that the segment has been accessed. The "written-flag" W field at bit position 5 is used to indicate whether or not the segment has been written into. If written-flag W is set to "0" it indicates that the segment has not been written into, whereas if W is set to "1" it indicates that the segment has been written therein. These flags are updated by firmware at each segment access, including indirect addressing and procedure or semaphore gating (the subject of another invention.) Available bit A located in bit position 3 is a one-bit A-field which indicates whether or not the segment is available. If indicator A is set to "1" the segment to which the descriptor corresponds may be accessed (i.e. it is unlocked) whereas if indicator A is set to "0" the segment is locked, and a reference to the segment descriptor causes a locked segment exception. Gating indicator G-S is a two-bit G-S field which is checked when predetermined instructions are to be executed. For example, the Enter Procedure (ENT) instruction, (not shown) requires that the G-S field contains the code 1 0 whereas instructions on semaphores require the code 0 1. Any code other than that required will cause an invalid segment descriptor exception. The MBZ field located at bit position 4 indicates when set to "0" that the segment addressed is no larger than a predetermined size, and an invalid segment descriptor exception results if MBZ is not set to "0". The segment base X24 in the direct segment descriptor is a 24-bit base field which indicates the absolute address of the base of a segment defined in the direct segment descriptor. The indirect segment descriptor shown on FIGS. 2B has a reduced number of indicator and a 28-bit descriptor location field which defines the absolute address of a direct descriptor. The P, I, MBZ, A indicators of indirect descriptor 200B on FIG. 2B perform the equivalent functions for the indirect descriptor that these indicators perform for the direct descriptor.

To provide maximum flexiblity, each process has the capability of accessing typically 2,048 memory segments, although the capability may be for any other number, greater or less. Normally, this would require up to 2,048 segment descriptors per process. However, in a group of processes running together, there is normally a large number of segments being used by more than one process. Therefore, segment descriptors are grouped in segment tables depending on whether they can be accessed by one process, a group of processes (job) or any process in the system. (This grouping also is an aid in program protection.) Thus, a series of segment descriptor tables is formed for single program use, multiprogram use, or system-wide use. Utilizing this system, each segment has only one segment descriptor. Thus, the amount of memory space required for segment descriptors is decreased and the amount of updating during memory reallocation is decreased. FIG. 3 illustrates this feature of the invention. Referring to FIG. 3 the segment descriptors are organized into 3 different segment descriptor tables 304, 305, and 306. Segment descriptor table 304 is a table of common segment descriptors which is indicated by the fact that processes A, B, and C of blocks 301, 302, and 303, respectively may access table 304 as shown by arrows 307, 308, and 309. Moreover it will be seen that only processes B and C shown by blocks 302 and 303 respectively may access job segment descriptors 305, whereas only process C of block 303 may access process C segment descriptors 306.

Because of the great number of jobs that may be present in the system, and therefore the number of segment tables, each process must be able to determine which segment tables it is allowed to access. To provide this capability, each process has two segment table word arrays. The segment table word arrays contain the addresses of all segment tables the process may access. The segment tables contain the segment descriptors hereinbefore described. The segment table word arrays (STW) contain segment table words (STW's) the form of which is shown on FIG. 2M.

Figure 2C:
Figure 2D:
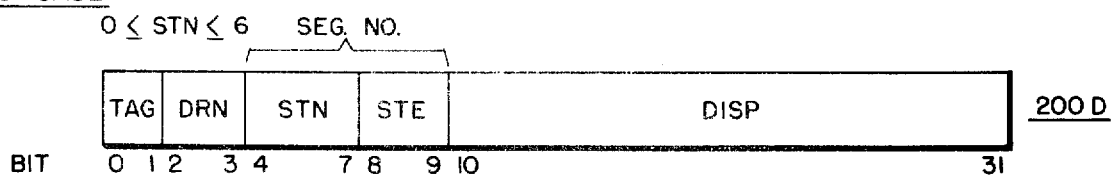
Figure 2E:
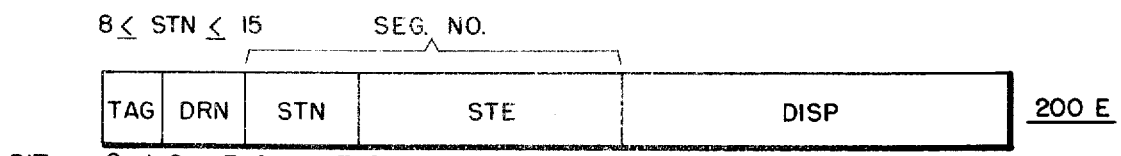
Figure 2J:
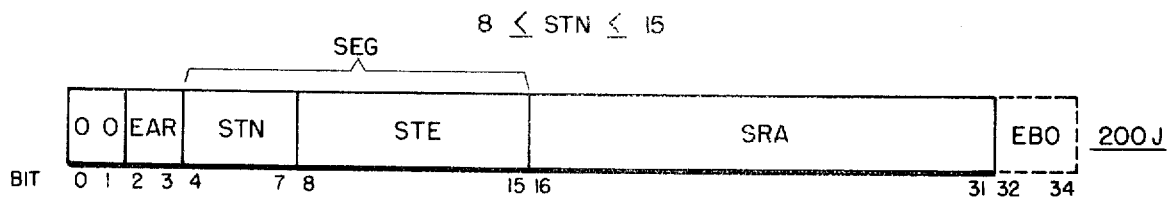
Figure 2K:
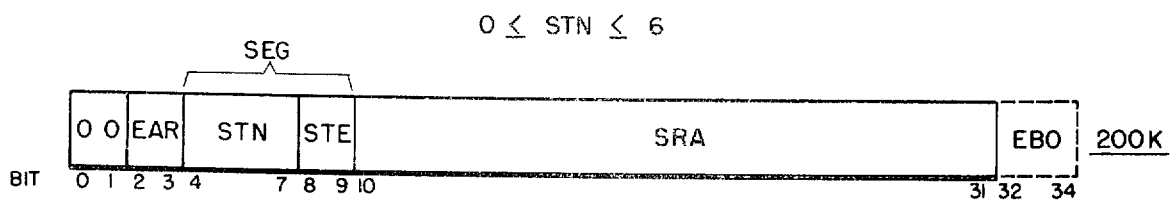
Figure 2L:
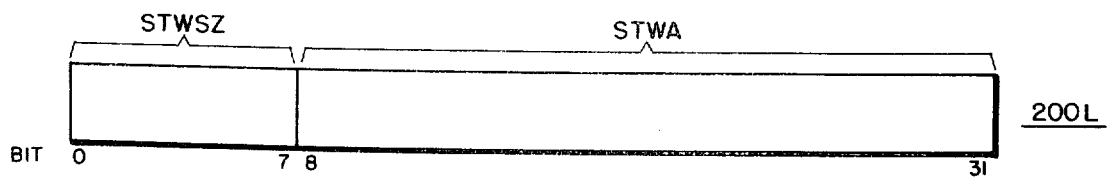
Figure 2M:
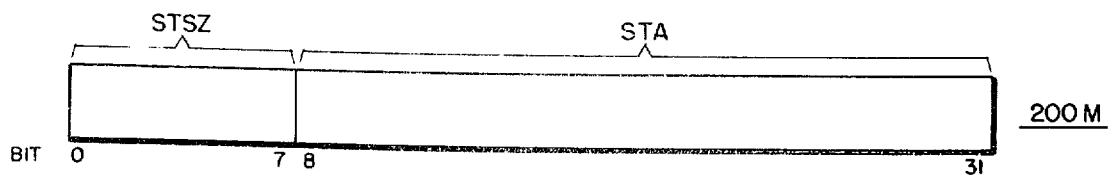

Referring to FIG. 2M the size field STSZ bit position (0-7) defines the total number of segment descriptors in the segment table. The number may vary from 0 to 4 for the STW's in the array no. 0 pointed to by address space word ASW no. 0 (to be later described); and from 0 to 255 for the STW's in array no. 1 pointed to by the ASW no. 1. When STSZ is equal to "0" the segment table is empty. The segment table address field STA (bits 8-31) define the absolute address of the segment table which is equal to :

16 X STA in bytes.

Segment table word arrays STWA are identified by the address space words ASW previously mentioned and having the f rmat shown on FIG. 2L. Referring to FIG. 2L the format of an ASW, it will be noted, is similar to the format of STW; however, the STWSZ field refers to the size of the array. The maximum value of STWSZ is 6 for ASW no. 0, and 8 for ASW no. 1. The STWA field (bits 8-31) addresses the absolute address of STWA of the array in units of 16 bytes.

Figure 4:
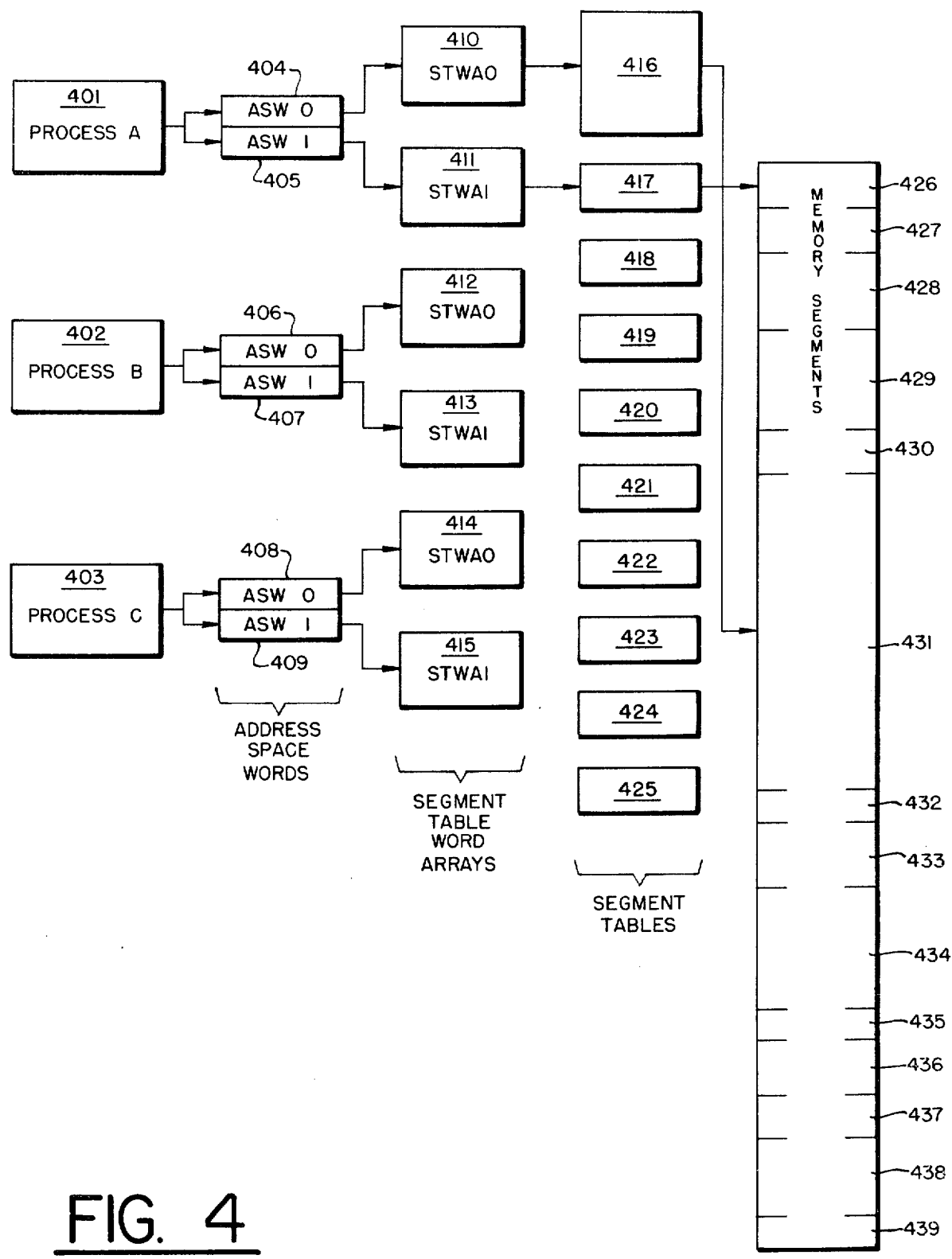
FIG. 4 is a schematic diagram of the general segmented addressing hardware structures and general segmented addressing method flow.

Referring now to FIG. 4 some general segmented addressing structures are shown whereby a given process may access an authorized segment. A given process A, B, or C indicated by blocks 401, 402, or 403 respectively has associated with it two address space words ASW0 and ASW1 represented by blocks 404 through 409. The address space words ASW are located in a process control block PCB that is created by a given process. (A process control block is associated with each process and contains pertinent information about its associated process, including the absolute starting address of tables defining the segment tables the process may access.) Each process requires two address space words ASW because two types of segments may be associated with each process--very large segments having a displacement range ($2^{22}$ -1), and a large number of smaller segments having displacement from zero through ($2^{16}$ -1). The address space words 404-409 provide the address of the segment table word arrays STWA's 410 through 415. The segment table word arrays STWA's contain the STW descriptors previously described and provide the address of the segment tables that the associated process may access. The segment tables 416-425 containing the segment descriptors previously described are utilized to define a particular segment 426-439 in main memory location.

Address Development

The development of the absolute main memory address consists of two phases: (1) the development of an effective address from an address syllable containing a logical address; (2) and the development of an absolute address from the effective. An SRA segment relative address address is developed from information contained in an address syllable and information contained in a base register wherein the SRA, consists of adding the offset in the base register to the displacement in the address syllable to obtain a segment relative address SRA. The effective address is obtained by adding the contents of an index register if any to the segment relative address SRA. In the second phase, the absolute address is developed by using the segment number SEG in the base register to access a segment descriptor and adding the base address in the segment descriptor to the segment effective address.

Effective Address Development

In effective address development a base register is utilized together with an address syllable. In the instant invention there are typically 8 base registers identified by numbers base register 0 through base register 7. (See block 1102 of FIG. 11) The format of the base register is shown on FIGS. 2F and 2G. Once again it will be obvious that 2 formats are needed for addressing two different types of segments. The format of the base registers shown on FIGS. 2F and 2G are similar with the exception that the different entities occupy different bit field locations. Referring now to FIGS. 2F and 2G there is shown the TAG which is a 2 bit field which corresponds to the TAG of a data descriptor shown on FIGS. 2C-2E. A 2 bit field RING contains the ring number associated with the segmented address and is utilized for protection purposes. (This concept is the subject of another invention assigned to the instant assignee.) The segment identification field SEG is comprised of the segment table number STN and segment table entry STE and is the field which identifies a segment described in a segment table. The OFFSET is a 16 bit or 22 bit field, depending on segment table number, which defines a positive integer and is used in the process of address development as a pointer within a segment.

The format of the address syllable is shown on FIGS. 2H and 2I. Referring to FIGS. 2H and 2I the indirection bit IND is utilized to specify the direct or indirect addressing mode. When the contents of the indirection bit IND is "0" the direct addressing mode is specified whereas if the content of the indirection bit IND is "1" the indirect addressing mode is specified. The BR field specifies which of the 8 base registers is to be referenced by the effective address development mechanism. The indexing bit IDX is utilized to specify whether or not an index register is to be utilized in address development and also the length of the displacement field D. If the contents of IDX is "0" it indicates that no index register is to be used and that the displacement D is 15 bits long. If the index bit IDX is equal to "1" it indicates that an index register specified by the field IXR is to be used and that the displacement field D is 12 bits long. Therefore, it is seen that the format of FIG. 2I is the indexing format of the address syllable. The IXR field exists only if IDX is equal to one and specifies the index register to be referenced by the effective address development. The displacement D specifies a positive integer to be used as a displacement. If IDX is equal to "0", the maximum value of D is $(2^{15} -1)$; whereas if IDX is equal to "1" the maximum value of D is $(2^{12} -1)$. It will be noted that the address syllable format begins with bit 12 and ends with bit 31. The reason for this is that the address syllable usually comprises a portion of an instruction and is incorporated into the instruction beginning at bit 12.

The development of an effective address from an address syllable may proceed in four different ways: (1) The effective address development may be direct; (2) the effective address development may be indirect; (3) the effective address development may be direct and indexed; and (4) the effective address development may be indirect and indexed. All four types of address syllables contain a base register field (BR); the base register field is used to access a base register, the contents of which may be in the two formats 200F and 200G of FIGS. 2F and 2G respectively. The contents of the base register are manipulated by user programs utilizing a Load Base Register Instruction (not shown).

Figure 5:
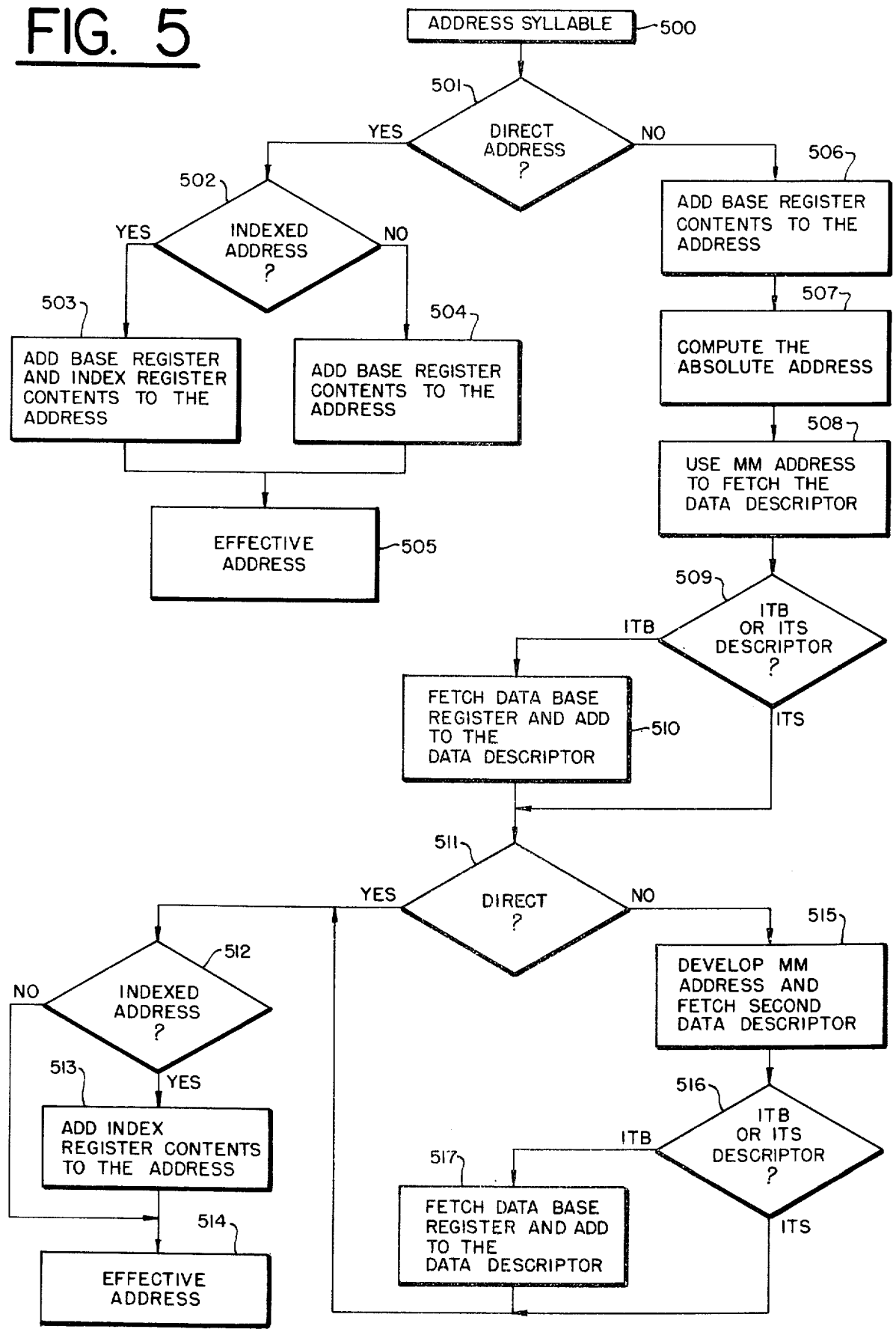
FIG. 5 is a segmented addressing development flow chart for effective address development by direct and indirect address development.
Figure 6:
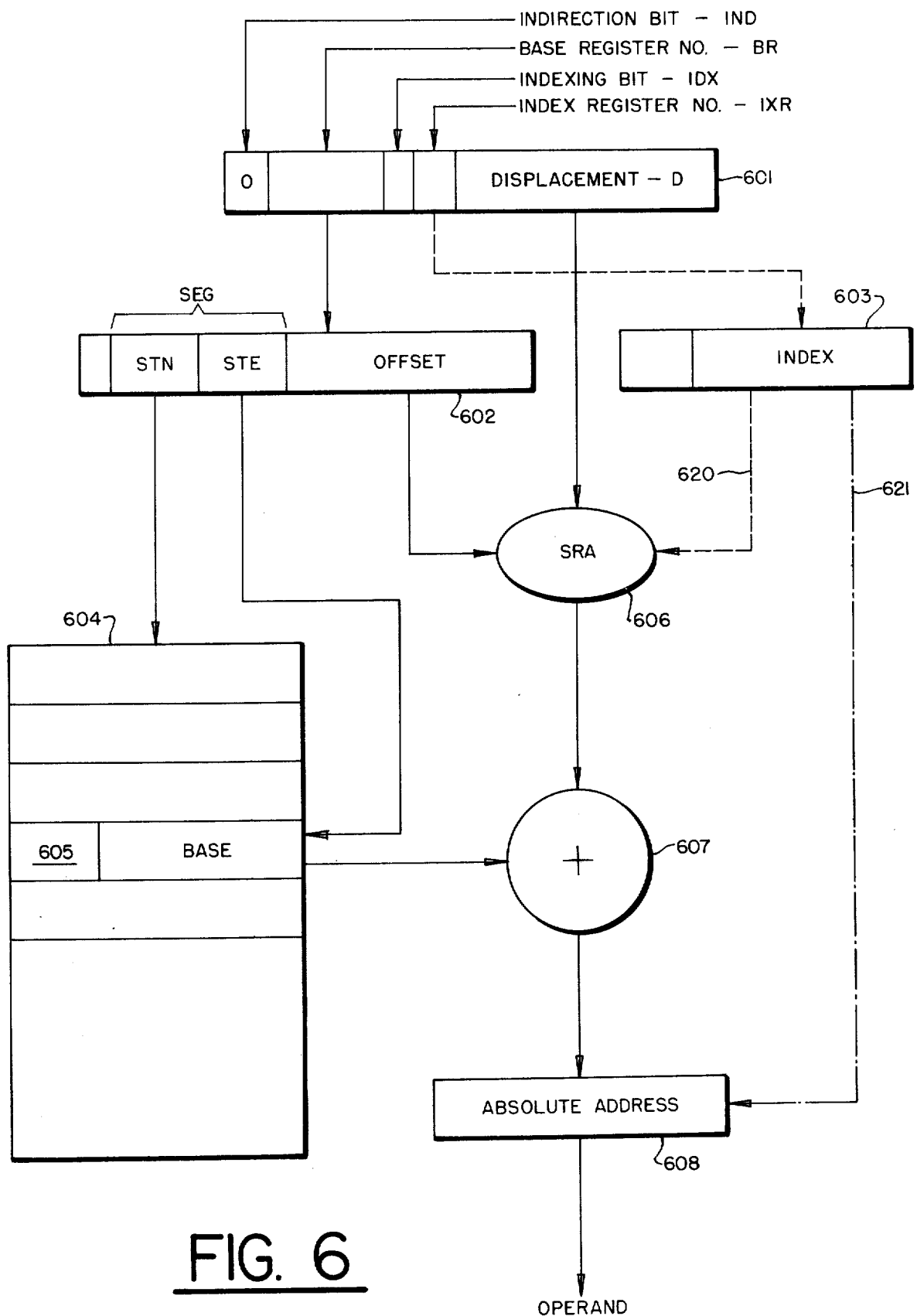
FIG. 6 is a schematic diagram of hardware for direct segmented address development

The direct method of effective address development is shown on FIGS. 5 and FIG. 6. Referring to FIGS. 5 and FIG. 6, a direct address syllable 500 on FIG. 5, and 601 on FIG. 6 —indicated by having its indirection bit IND set to zero, its index bit IDX set to zero, and a long displacement field D, —points to a base register 602 which provides the segment number SEG of segment table 604 and an offset within that segment table. Segment table 604 contains segment descriptors one of which in this particular example provides a base address for the segment described. Address syllable 601 also provides a displacement D. By adding the displacement D of address syllable 601 to the offset of base register 602 a segment relative address SRA is obtained. The basic elements of the effective address comprise the base of the segment identified by segment number SEG and the segment relative address SRA, and an Index (if any) in index register 602. In another embodiment the index from Index register 602 is not part of the effective address but is applied to the absolute address 608. (See dash dot arrow 621).

The format of the effective address is shown on FIGS. 2J and 2K. Note in this format an additional basic element the EAR (effective address ring number) is included. The EAR is protection information used in accessing storage and has a range of zero to three for operating within any of four privilege rings. (This concept as has been previously noted is the subject of another invention assigned to the instant assignee.) The bit field from bits zero to one has no significance in the effective address but corresponds to the TAG field of a data descriptor. The STN segment table number field defines any of fifteen segment tables associated with a given process. The segment table entry field STE defines a specific entry within a segment table which contains a segment descriptor and defines a specific segment. The segment relative address field SRA is a 16 or 22 bit positive integer specifying the number of bytes from the base of the segment to the first byte of the operand. For a large segment, (segment zero to six), SRA may range from 0 to $(2^{22} -1)$. For small segments (segments eight to fifteen), SRA may range from 0 to $(2^{16}-1)$. The effective address bit-offset (EBO) field exists only when the operand in storage is a bit string (not shown or described herein).

Address development hardware 607 (to be later described in greater detail) obtains the absolute address of the beginning of the segment indicated by the base address of segment descriptor 605 which in turn is referenced by the segment number SEG, and adds the base address to the segment relative address SRA to obtain an absolute address 608.

Referring to FIG. 5 reference numerals 500, 501, 502, 504, and 505 indicate effective address development using a direct syllable. Reference numerals 500, 501, 502, 503, and 505 indicate the second method of effective address development utilizing a direct indexed address syllable. The development of an effective address from a direct indexed address syllable (i.e. the indirect bit IND of FIGS. 2H and 2I is "0", the index bit IDX is "1", and a short displacement field is present) proceeds identically to the development from a direct address syllable, with one exception: The segment relative address (SRA is developed by the addition of the displacement field of address syllable 601 of FIG. 6, the offset field in base register 602 and the contents of the index register 6 3 specified by the index register field IXR of the address syllable.

The indirect or indirect indexed effective address development accesses an operand by one or two levels of indirection i.e. after generating an absolute address from the first effective address a data descriptor is fetched from which another effective address is developed prior to the development of the final absolute address which is actually used to fetch an operand. There are two modes of indirect and indirect indexed address development: one is the indirection to base mode ITB wherein a data descriptor having the format 200C on FIG. 2C is fetched and the other indirection to segment ITS mode wherein a descriptor having the format 200D on FIG. 2D is fetched.

Referring to FIGS. 2C through 2E there are shown two different types of data descriptors. FIG. 2C shows the indirection to base ITB data descriptors whereas FIGS. 2D and 2E show the indirection to segment ITS data descriptors. Another format FIG. 2CDE, is an extended data descriptor and may be appended to or concatenated with the other type data descriptors at bit position 3L. There are also two different formats for the ITS data descriptor one being the format of FIG. 2D which is utilized to reference segment table numbers identified as 0 through 6 in the machine generally reference large segments whereas the data descriptor of FIG. 2E is utilized to reference segment table numbers STN identified as 8 through 15 in the machine which are utilized to reference smaller segments. A data descriptor may also reference operands rather than other data descriptors or segment descriptors.

The minimum size of a data descriptor is four bytes. The storage location of a data descriptor is specified by the address of the left most byte, which may be any byte address. The data descriptor defines addresses in storage either by an indirection to base (ITB) or by an indirection to segment (ITS). ITB is identifed when bits 4 through 7 of the above formats 200-C through 200-E are equal to 0111. ITS is identified when bits 4 through 7 of the data descriptor format are different from 0111. The ITS descriptor specifies a segment number (SEG) comprised of segment table number (STN) and segment table entry (STE) to be used in the development of an effective address. ITB descriptor is an equivalent address syllable that is developed into an effective address via a data base register.

Referring now to FIGS. 2C through 2E, the TAG identifies the type of descriptor. The contents of the TAG is interpreted as follows:

00 is the normal direct descriptor which points to data;

01 is the extended direct data descriptor wherein the descriptor points to date;

10 is the indirect descriptor wherein the descriptor points to another descriptor;

11 indicates a fault.

The DRN field indicates the ring number that may be accessed by that particular descriptor. (The concept of ring numbers is the subject of another invention and is described in another patent application assigned to the same assignee as the instant invention). STN indicates the segment table number referenced by that descriptor when bits 4 through 7 of its format contain any number other than 0111. STE the segment table entry typically ranges from 0 to 3 (i.e. references very large segments) for STN between 0 and 6 (format 200D) whereas STN between 8 through 15 range from 0 to 254 (i.e. references smaller segments) (format 200E). The segment table number STN and the segment table entry STE define the segment number SEG. Hence it will be observed that data descriptor format 200D describe four segments identifying segment numbers SEG 0 to 4 in the machine whereas data descriptor having format 200E describe 256 segments identifying segment numbers SEG 0 to 255 in the machine a large number of much smaller segments. The displacement DISP indicates the byte addressed of a word of a segment specified by segment number SEG comprised of segment table number STN and segment table entry STE. As an example therefore and assuming a data descriptor format 200D or 200E, if STN contained the number 5 and STE contained the number 7 and DISP contained the number 4 it would indicate that the 4th byte of a word in the segment indicated by the 7th descriptor in segment table number STN 5 is to be accessed.

An ITB descriptor is an address syllable that is developed into an effective address via a data base register. An ITS descriptor is an effective address used to develop an absolute address. Upon developing an effective address, whether from an ITB or ITS descriptor, a check is made to insure a second level of indirection is not required. If a second level of indirection is not required, a check is made to determine if the index bit in the address syllable equals one. If the index bit equals one, the contents of the index register specified in the address syllable are added to the address. If a second level of indirection is required, it is performed identically to the first level. Thus, any number of levels of indirection are allowed up to 16 levels during segmented address development. Each effective address consists of a segment number, which directs the access to a specific segment of memory, and the displacement, which directs the access to a specific locations within the segment. The segment number is actually composed of two fields as noted supra—the segment table number STN and segment table entry STE. STN is used to develop the address of the segment table whereas STE is used to develop the address of a segment descriptor within the table. As described previously, the segment number is taken from the base register which is accessed by the address syllable. Therefore, the segment number is either 6 or 12 bits, depending on the base register that was accessed and its format which may be either 200F or 200G. Also as previously discussed base register format 200G consists of a 6 bit segment number SEG which is comprised of a 4 bit segment table number STN field and a 2 bit segment table entry STE field. The 4-bit STN field of which the most significant bit equals zero, allows access to 7 segment tables 0–6 (STN equal to 7 is illegal). The 2-bit STE field allows 4 segment descriptors within each table or 4 entrys to that table. The size of the segments accessed through these tables may be up to 4 megabytes, since a 22-bit offset is provided. Using this format, a process may access 28 4-megabyte segments (7 segment tables, 4 segment descriptors per table). Base register format 200F provides a 12-bit segment number SEG comprised of a 4-bit segment table number STN field and an 8-bit segment table entry STE field. The 4-bit STN field of which the most significant bit equals one, provides access to 8 segment tables. The 8-bit STE field allows 256 segment descriptors within each table. The size of the segments accessed through these tables may be 64 kilobytes, since a 16-bit offset is provided. This format provides access to 2,048 64-kilobyte segments (8segment tables, 256 segment descriptors per table). It is understood that different number of tables or segments may be utilized with the invention.

Figure 7:
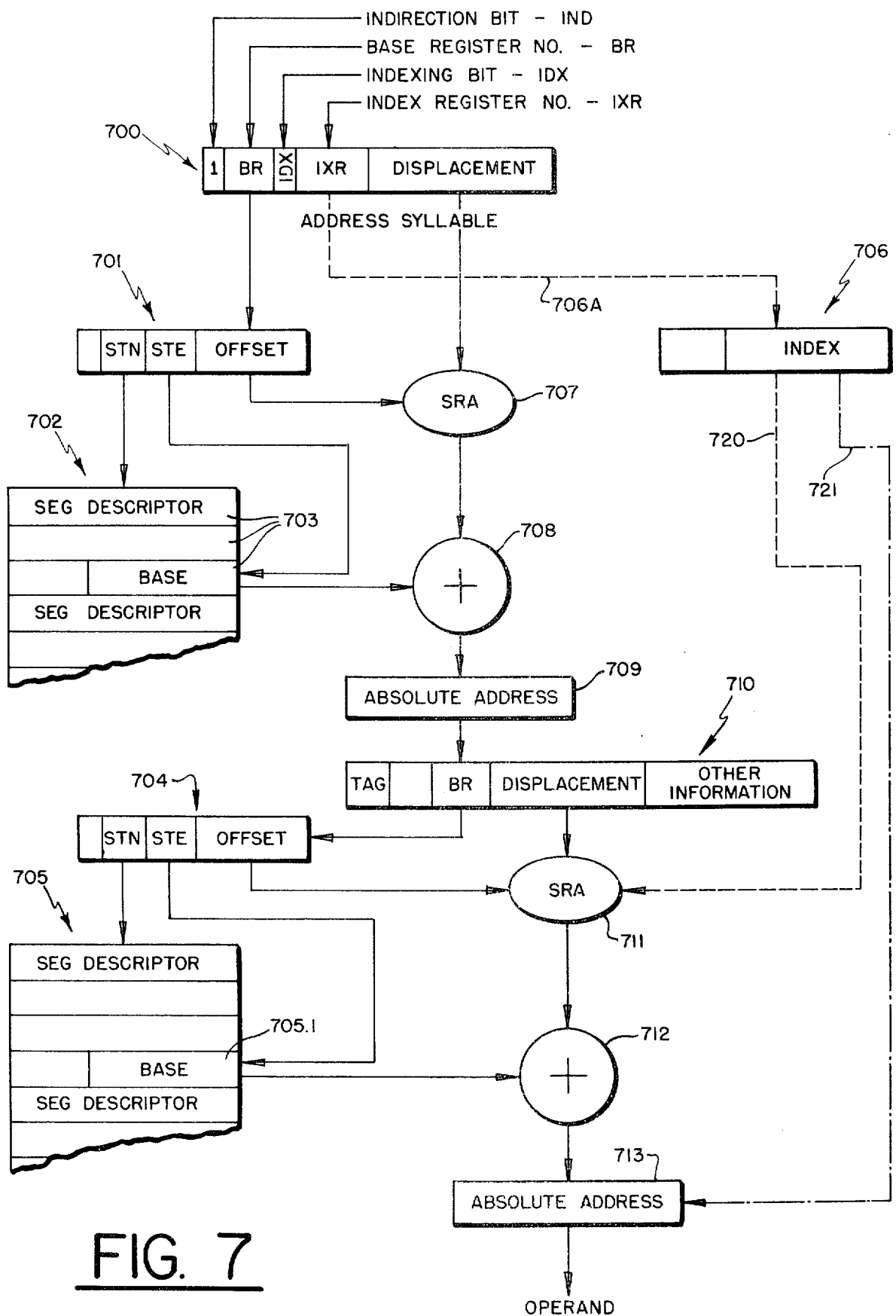
FIG. 7 is a schematic diagram of hardware for indirect segmented address development with indirection to base (ITB).

The flow chart of FIG. 5 reference numerals 506 through 517 show the steps of segmented effective address development for the indirect and indirect index modes. FIGS. 6 and 7 show the hardware requirements for generating the effective and absolute segmented addresses of the indirect and indirect indexed modes. Referring now to FIGS. 5, 6, and 7 a segmented relative address SRA 606, 711 is developed similar to the direct mode of segmented addressing, and the effective segmented address is developed utilizing the segment relative address SRA 606, 711 and the segment table number and segment table entry of base registers 602, 701. (See formats 200J and 200K discussed supra for formats of the effective address). An absolute address 608, 709 is developed by a method and absolute addressing hardware to be described later which is then utilized to develop the final effective address which will be utilized to develop the final absolute address which accesses the operand.

Referring more specifically to FIG. 7 and assuming the address syllables 700 has a "1" in its indirection field IND which indicates indirect addressing mode. The base register field BR of address syllable 700 points to base register 701 which in turn provides a segment number SEG (i.e. STN and STE) which in turn provides a segment table entry of segment descriptors 703 which are included in the segment table 702. The indexing bit IDX of address syllable 700 in this particular example is set to "0" and specifies that no index register is to be utilized; if the indexing bit IDX were set to "1" it would specify an indirect indexed mode of addressing and index register 706 pointed to by dashed line 706A would be utilized in the final formation of the segment relative address SRA. The segment relative address SRA 707 is formed from the OFFSET of base register 701 which points to the first byte of a word within a segment whose base location is pointed to by the BASE FIELD of the segment descriptor pointed to by STN and STE and the DISPLACEMENT of address syllable 700 which points to the byte of a word. The segment relative address SRA together with SEG are elements of the effective segmented address in this example because no indexing was required. If indexing was required the effective address would include the Index. This effective segmented address is utilized by a method and hardware to be described infra, to form an absolute address 709 of a data descriptor. The base register BR field of data descriptor 710 would in this ecample have the code 0111 which indicates that data descriptor 710 has the indirection to base ITB format (see data descriptor format 200C-200E). The base register field BR of data descriptor 710 also points to the data base register 704. The OFFSET of data base register 704 and the DISPLACEMENT of data descriptor 710 and, when used, the INDEX of index register 706 form the segment relative address SRA 711. The segment relative address SRA 711 together with SEG and an Index (if required) comprise a second segmented effective address which is utilized to form the absolute address 713 of an operand to be accessed in main memory.

Figure 8:
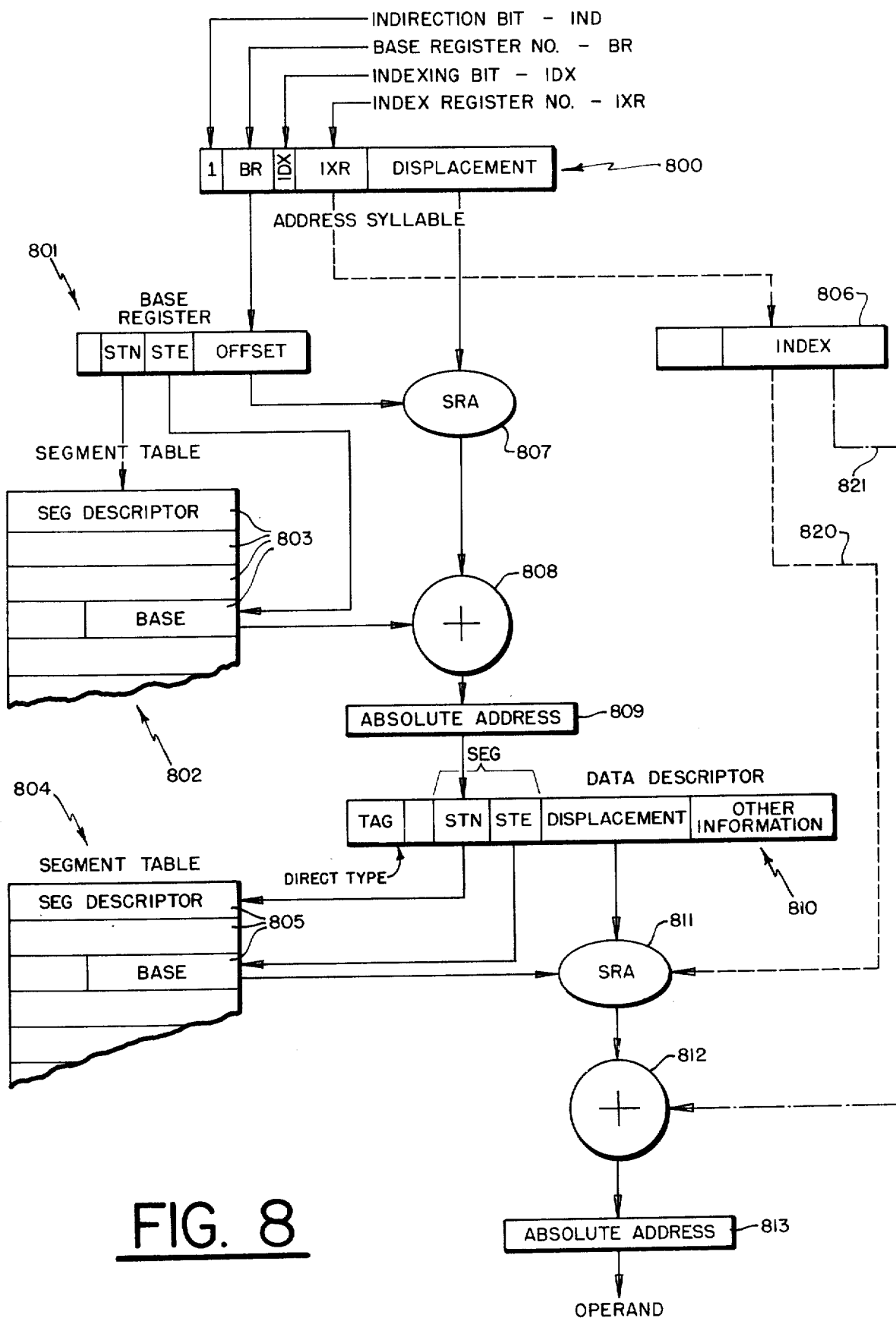
FIG. 8 is a schematic diagram of hardware for indirect address development with indirect to segment (ITS).

Referring now to FIG. 5 reference numerals 506–509, 511, 515–517, and 512–514 and also to FIG. 8 there is shown the method and hardware for indirect address development utilizing indirection to segment ITS mode. Note that the hardware and method are practically similar to the ITB mode with the exception that data descriptor 810 (710 on FIG. 7) does not point to a base register as does data descriptor 710 but rather directly to the segment via its segment number SEG. The format therefore of data descriptor 810 is different than data descriptor 710 in that it has the format 200D or 200E of FIGS. 2D or 2E respectively. In other respects it will be observed that the hardware and method are substantially similar.

Absolute Address Development

Figure 9:
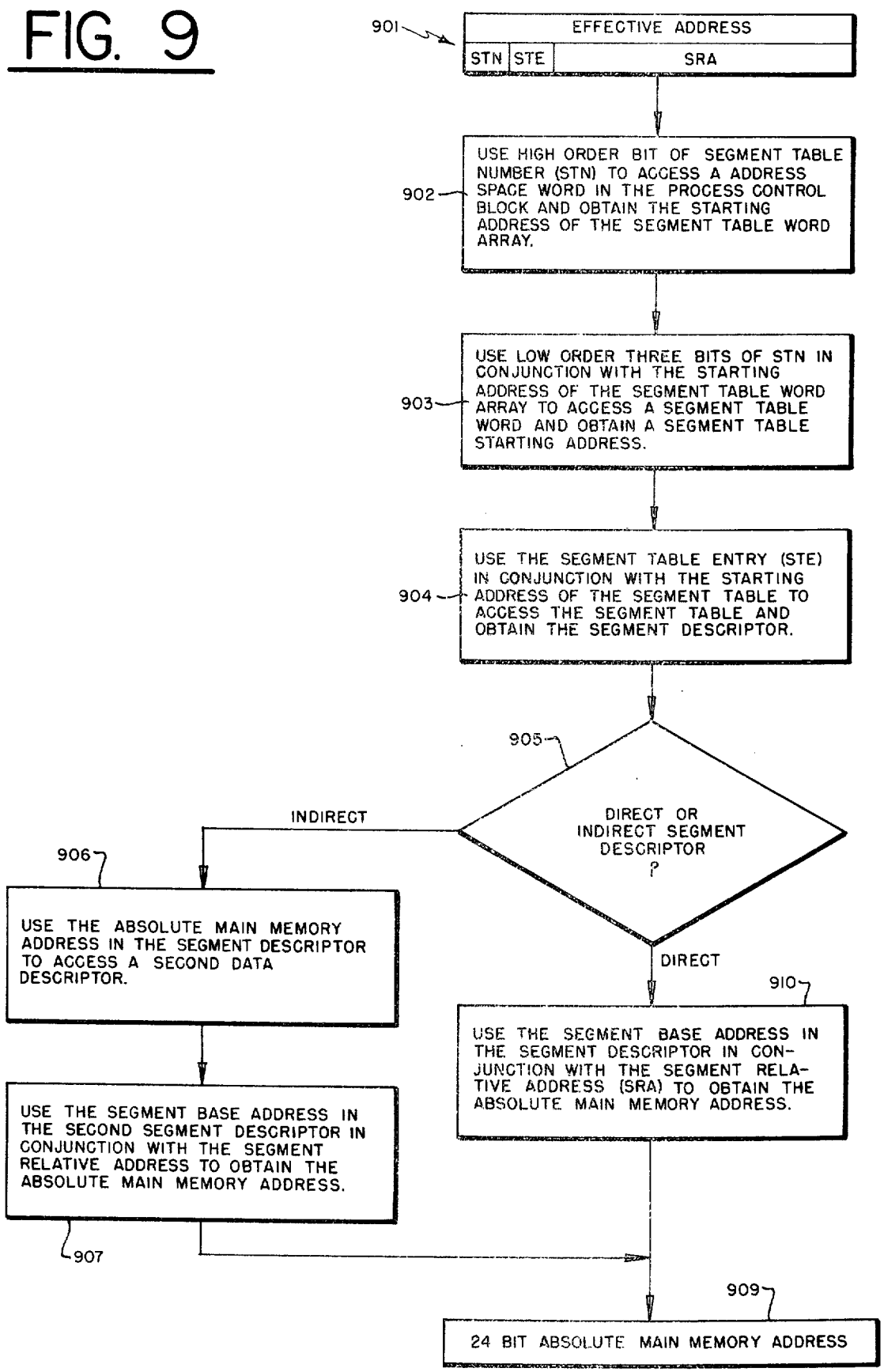
FIG. 9 is a segmented address development flow chart for absolute address development.
Figure 10:
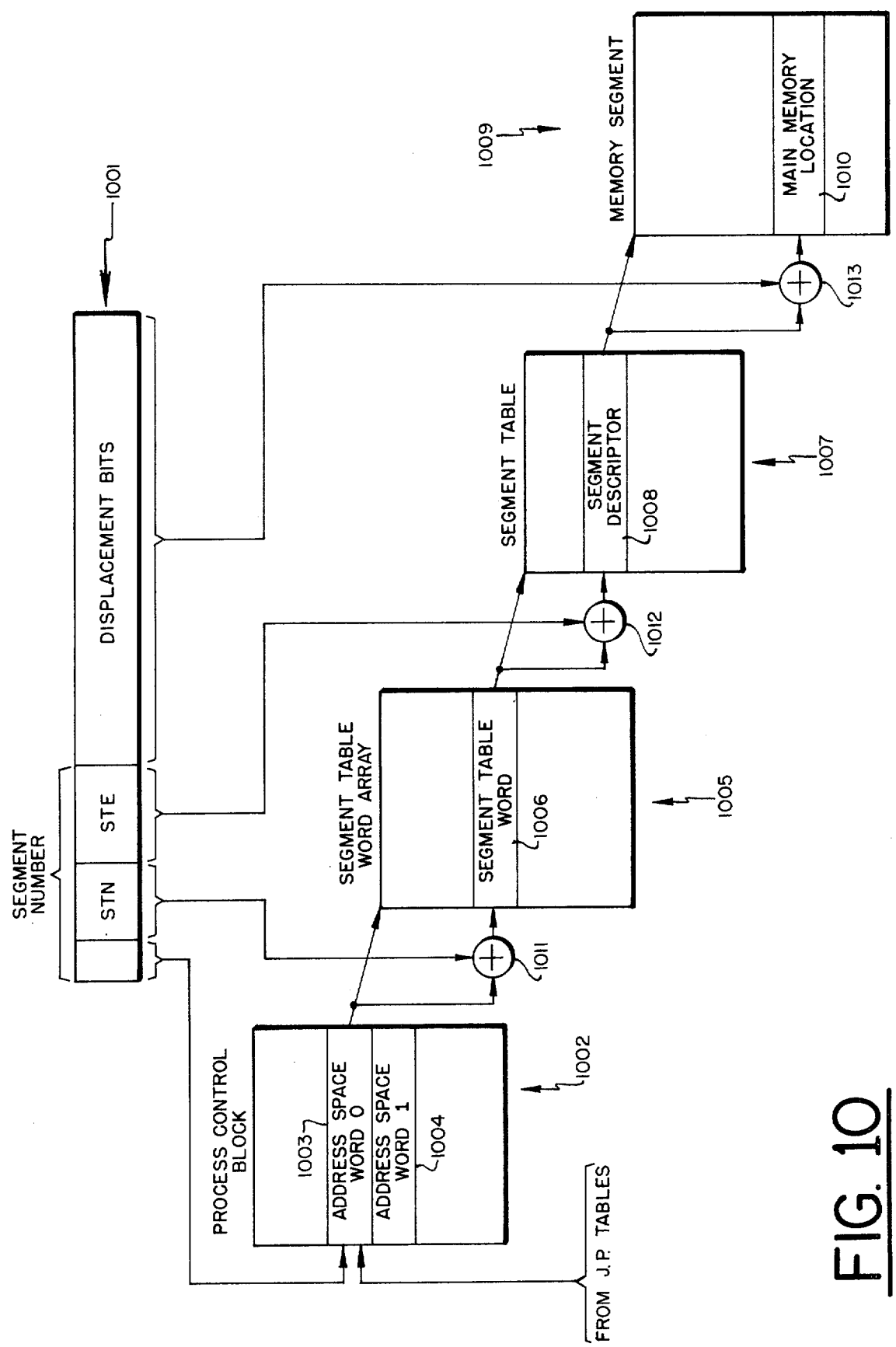
FIG. 10 is a schematic diagram of hardware for absolute address development.

Having developed the elements of segmented effective address the absolute address of the operand or descriptor, as the case may be, can be developed. Referring to FIGS. 9 and 10 there is shown one embodiment of method and hardware for absolute address development. In this embodiment the process control block 1002 is referenced by J. P tables (see glossary). The high order bit of the segment table number STN of the effective address 1001 is used to access one of two address space words 1003 or 1004. The address space word accessed contains the base address of a segment table word array 1005 the contents of the address space word are added to the low order 3 bits of the segment table number STN of effective address 1001 via adder 1011 to produce the address of a segment table word 1006 within the segment table word array 1005. Each segment table word 1006 contains the absolute starting address of a segment table 1007 which contains segment descriptor 1008. Therefore, reading the segment table word 1006 and adding the segment table entry STE of effective address 1001 via adder 1012 produces the address of a particular segment descriptor 1008 within the segment table 1007. As has been heretofore described segment descriptors contain information about an associated memory segment, including starting or base address of the segment and the length of the segment. Thus, by adding the segments absolute starting address (see format of segment descriptor described supra) and the displacement bits of the segmented relative address of effective address 1001, the desired main memory address 1010 is obtained. It should be noted from the above explanation that the effective main memory address can be referenced to the absolute main memory address only by accessing the segment tables. However, because of the number of memory accesses that must be made to obtain the base address of the memory segment contained in the segment descriptor, an associative memory in the central processing unit CPU shown in FIG. 11 typically stores the 8 most recently used segment descriptors along with their segment numbers. During absolute address development, the segment number in the effective address 1001 is compared to the segment number in the associative memory, and if a hit or equal comparison is found, the segment descriptor in the associa ive men ory is used for the address formation. (This associative memory technique of address formation is the subject of an invention by James L. Brown and Richard P. Wilder, Jr., entitled "Address Development Technique Utilizing a Content Addressable Memory" and filed in the U.S. Patent Office 8/24/72 and having Ser. No. 283,617 and assigned to the same assignee as the instant invention.) If however an equal comparison is not found, the segment descriptor 1008 is fetched from memory in the normal manner and stored in the associative memory 1106, along with its segment number, for future reference. It will be noted that the segment descriptor in the preceeding explanation of absolute address development was assumed to be a direct segment descriptor; however, the descriptor may be an indirect descriptor which contains the absolute address of a second descriptor. The address of the second descriptor is utilized to fetch a second data descriptor, which contains the segment's absolute starting address.

Figure 11:
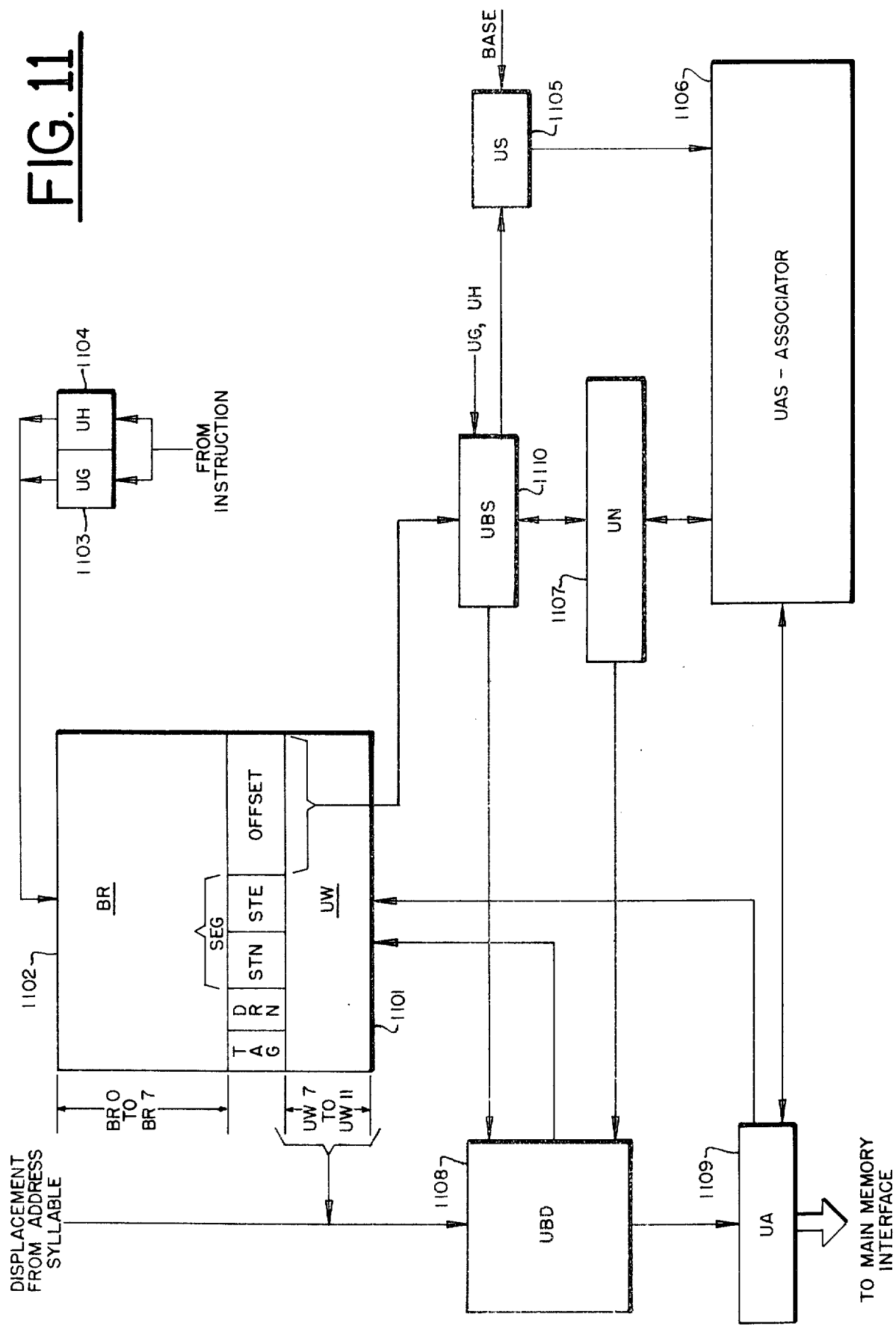
FIG. 11 is a schematic diagram of hardware for segmented addressing development utilizing a content addressable memory.

Referring to FIG. 11 there is shown hardware for developing the effective and absolute address of a segment utilizing an associator or content addressable memory 1106. (Details of the associator are described in U.S. Pat. Office Application No. 283,617 filed on 8/24/72 by J. L. Brown and R. P. Wilder, Jr. now matured into U.S. Pat. No. 3,800,286 on Mar. 26, 1974, entitled "Address Development Technique Utilizing a Content Addressable Memory, now matured into U.S. Pat. No. 3,800,286.") Referring to FIG. 11 base registers BR0-BR7 are addressed via the UWB Data Selector 1203 (FIG. 12A) by the contents of UG and UH registers 1103 and 1104 respectively which contain base register addresses from an instruction, microinstruction or otherwise. Typical data selectors are nothing more than multiplexors and are commercially available from Texas Instruments Inc., of Dallas, Texas and may typically be of the SN54150 type data selector shown on pages 9-339 to 9-348 of the "The Integrated Circuits Catalog for Design Engineers" published by Texas Instruments Inc.) The segment number SEG of the base register address is placed in US register 1105 through UBS Selector 1110 and the OFFSET of the base register address is placed into UN register 1107 through the UBS Selector 1110 which is a multiplexor well known in the art, where it may be transferred to UBD Adder 1108 (also well known in the computer art) and added to Displacement from Address Syllable. The sum of the displacement and offset are then stored into 2 work register UW 1101. UAS associator 1106 (see prior referenced application of J. L. Brown, et al, for detailed description) is interrogated to determine whether the address in US register 1105 is located in the associator and if it is a HIT results and the Segment Base address is read into UN register 1107 from the Associator UAS 1106. Then the UW register containing the offset and displacement is read into the UBD Adder 1108 and is added to the Segment Base Address stored in the UN register 1107. The sum of this addition is the Absolute Address of the Address Syllable and may be delivered to the UA register 1109 for addressing main memory. The Absolute Address may also be stored into 2 work register (UW). If the information is not available in UAS associator 1106 the SEG is used to fetch the segment descriptor from main memory. The segment descriptor may then be placed in the Associator 1106 with the Hit Bit set for future usage.

Figure 12A:
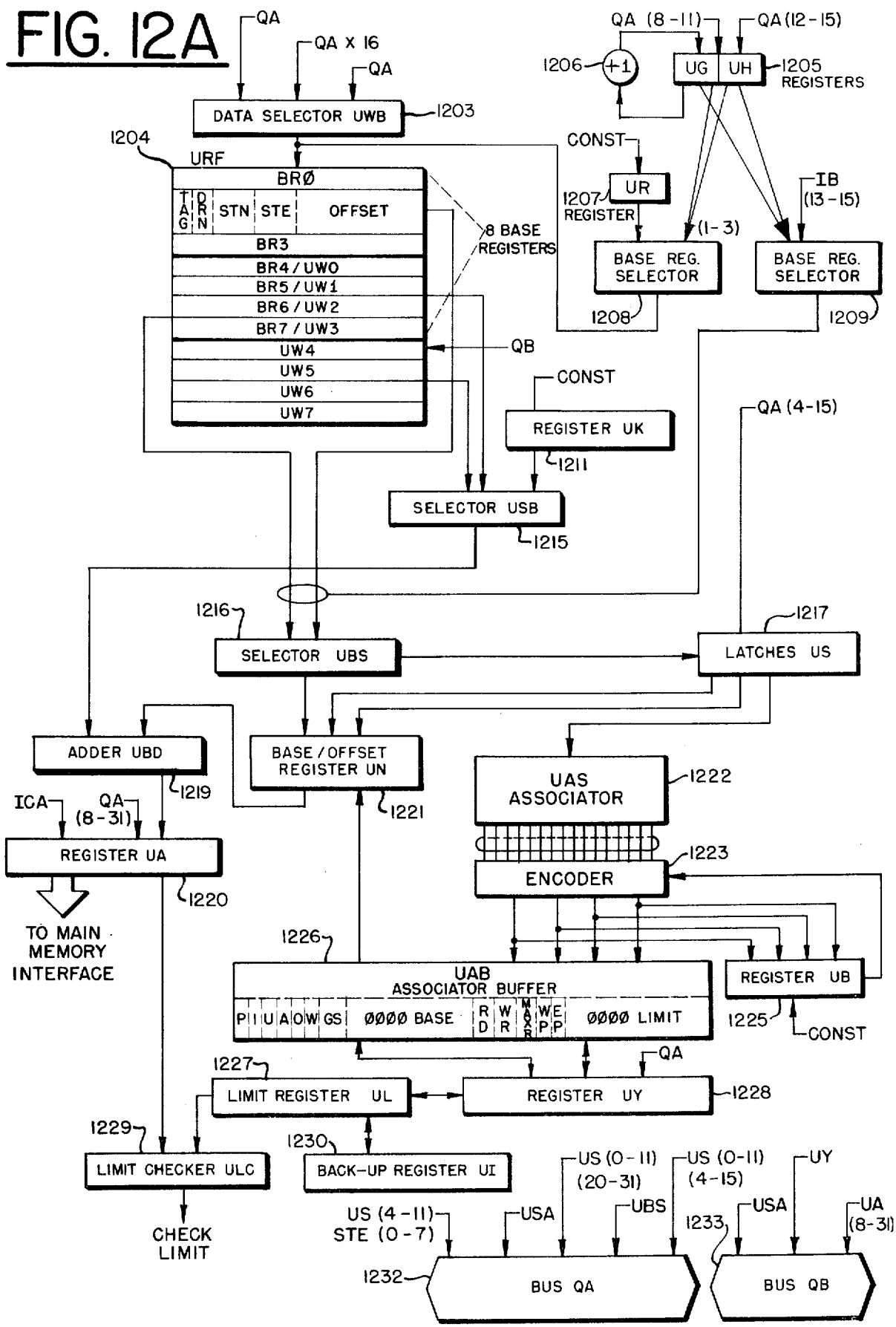
FIG. 12A is a schematic diagram of more sophisticated hardware for segmented addressing development.

Referring to FIG. 12A, there is shown more detailed hardware of FIG. 11. A register file 1204 includes four work registers UW4-UW7 and eight base registers BR0-BR7 which are used in the address development process. Each register is 36-bits wide (32 data, 4 parity). The register file is implemented with discrete logic and is so structured that any one register can be written into or three registers can be read out at a given time. The first eight registers BR0-BR7 in the file are base registers and are programmer visible; the last four registers UW4-UW7 are work registers that are visible only to hardware (native mode only).

Data to be written into the register file is selected from among several possible sources by the data selector (UWB), 1203 which may be nothing more than a multiplexor, while the specific register to be written into is specified by the write control logic 1203A (FIG. 12B) which is a part of Data Selector 1203 and may typically be of the TI SN54150 type to which reference was made supra. Register file read-out is accomplished through the selectors, USB 1215 and UBS 1216 which typically may also be multiplexors well known in the art. The asynchronous logic of the base register selector 1208 selects one of the first eight (base) registers via selector UBS 1216 while the address register UK 1211 performs the same function for the last eight (4 base plus 4 work) registers via selector USB 1215.

An adder UBD 1219 is used to add the contents of selector USB 1215 and base/offset register UN 1221. Destination of adder output is determined by the type of operation being performed.

Once an absolute address is developed it is delivered to the main store interface unit MIU (not shown) via the UA register 1220.

The limit register UL 1227 contains an address which is the limit or upper boundary for the absolute address contained in the UA register 1220. These two addresses are compared in the limit checker ULC 1229 which generates a check indication if the content of UA is less than UL.

The address associator 1222 contains the segment numbers STN/STE of up to 16 segment descriptors located in the associator buffer 1226. Each of the 16 locations in the address associator 1222 is composed of 12 data bits plus 4 bits for control and checking purposes. During address development the number of the desired segment is loaded into the US register 1217. The content of the US register (i.e. latches 1217) is subjected to a simultaneous parallel comparison with the segment numbers in all 16 address associator locations. This comparison takes less than one cycle (i.e., <510nsec.).

When a true comparison (i.e., a Hit) occurs the bits of the address associator word are decoded by the hit decoder/encoder 1223 into a 4 bit code which in turn selects the word in the associator buffer that contains the segment descriptor. Since a given segment number should have only one occurrence in the address associator, a multiple hit condition produces a check condition via the hit decoder. In a no-hit situation the descriptor for the desired segment is fetched from main store (not shown) via the bus QA 1232 and written into the associator buffer via the UY register 1228.

The UY register 1228 is employed to write into and read from the associator buffer.

Since the associator buffer contains descriptors for the 16 most recently used segments, and since most programs use only a few segments, more than ninety percent of all addresses can be developed via this high speed unit.

The various cycles involved in the selected address development example are shown in FIGS. 12B-12E and described below:

Cycle 1 (Hardware States of FIG. 12B)

a. The Displacement field of the instruction is delivered to a work register 1204 via the data selector 1203 and under control of write control logic 1203A.

b. The base register address is transferred to base register selector UBR 1209 which then selects the appropriate base register for read-out.

c. The base register offset field is transferred to the base/offset register. This will be used during cycle 2.

d. STN, STE (i.e. segment number SEG) is simultaneously delivered to US register 1217 (latch).

e. Simultaneous interrogation of all 16 address associator locations begins during read-in of US register 1217. At the end of Cycle 1:

1. The displacement field of the Instruction is in a work register.
2. Base register offset field is in base/offset register UN 1221.
3. Address associator is being interrogated.

Figure 12C:
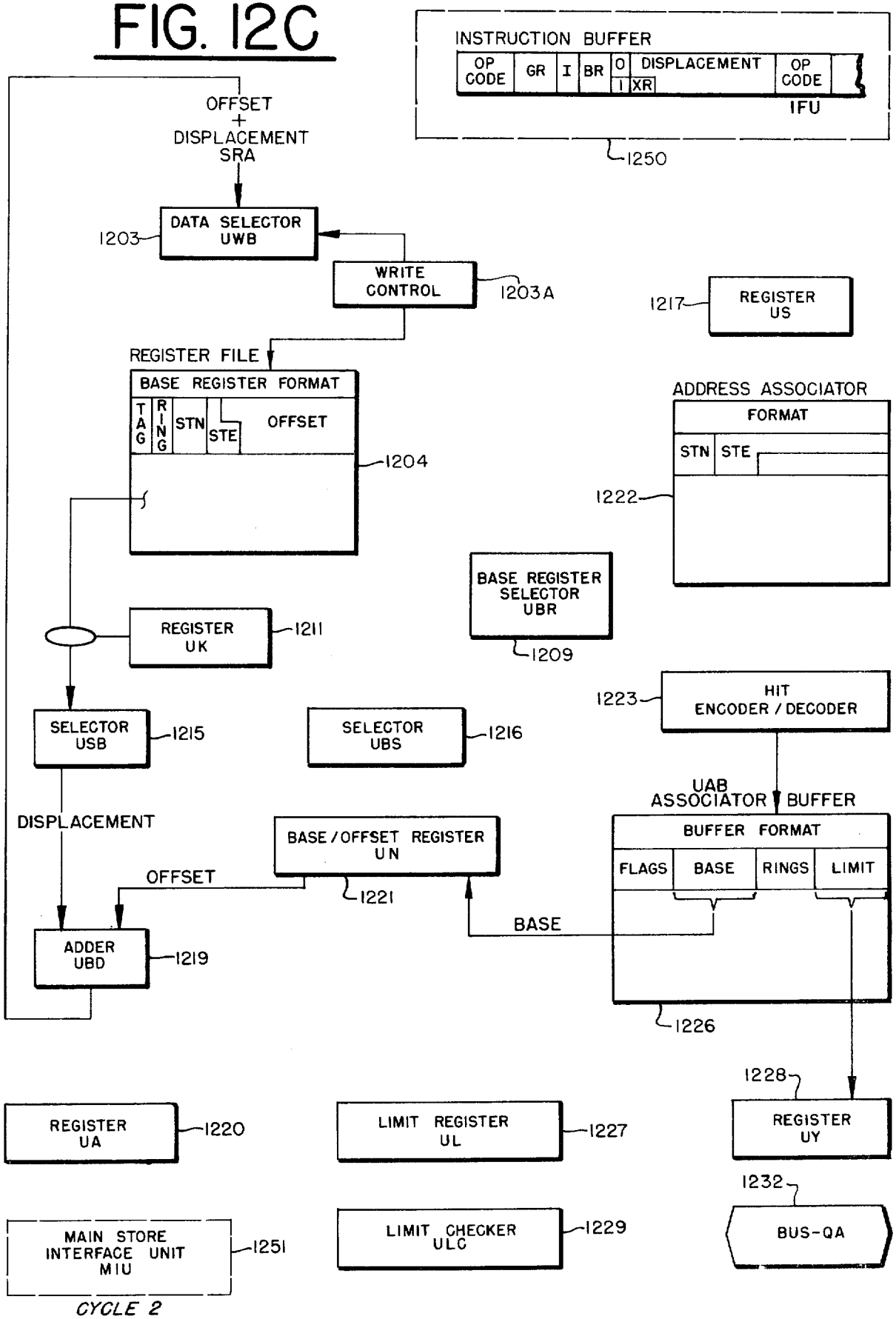

Cycle 2 (Hardware States of FIG. 12C)

a. The work register containing the displacement is selected by UK register 1211 and the displacement is transferred to the adder 1219 via USB selector 1215.

b. The offset is transferred from base/offset register UN 1221 to the adder 1217 where it is added to the displacement.

c. The sum of offset plus displacement (i.e. SRA) is transferred from the adder to a work register via data selector 1203.

d. Interrogation of the address associator is completed. Since the desired segment descriptor was assumed present in the associator buffer 1226 its segment number is in the address associator 1222 and a "Hit" condition occurs.

e. The content of the address associator location (in which the Hit occurred) is delivered to the hit decoder 1223 which in turn selects the appropriate buffer location for read-out.

f. The segment descriptor base is transferred to base/offset register UN 1221 the limit field is transferred to UL limit register 1227.

At the end of Cycle 2

1. SRA is located in a work register.
2. Segment descriptor base is located in base/offset register.
3. The limit (i.e., the address beyond which the absolute address cannot go) is located in the limit register.

Figure 12D:
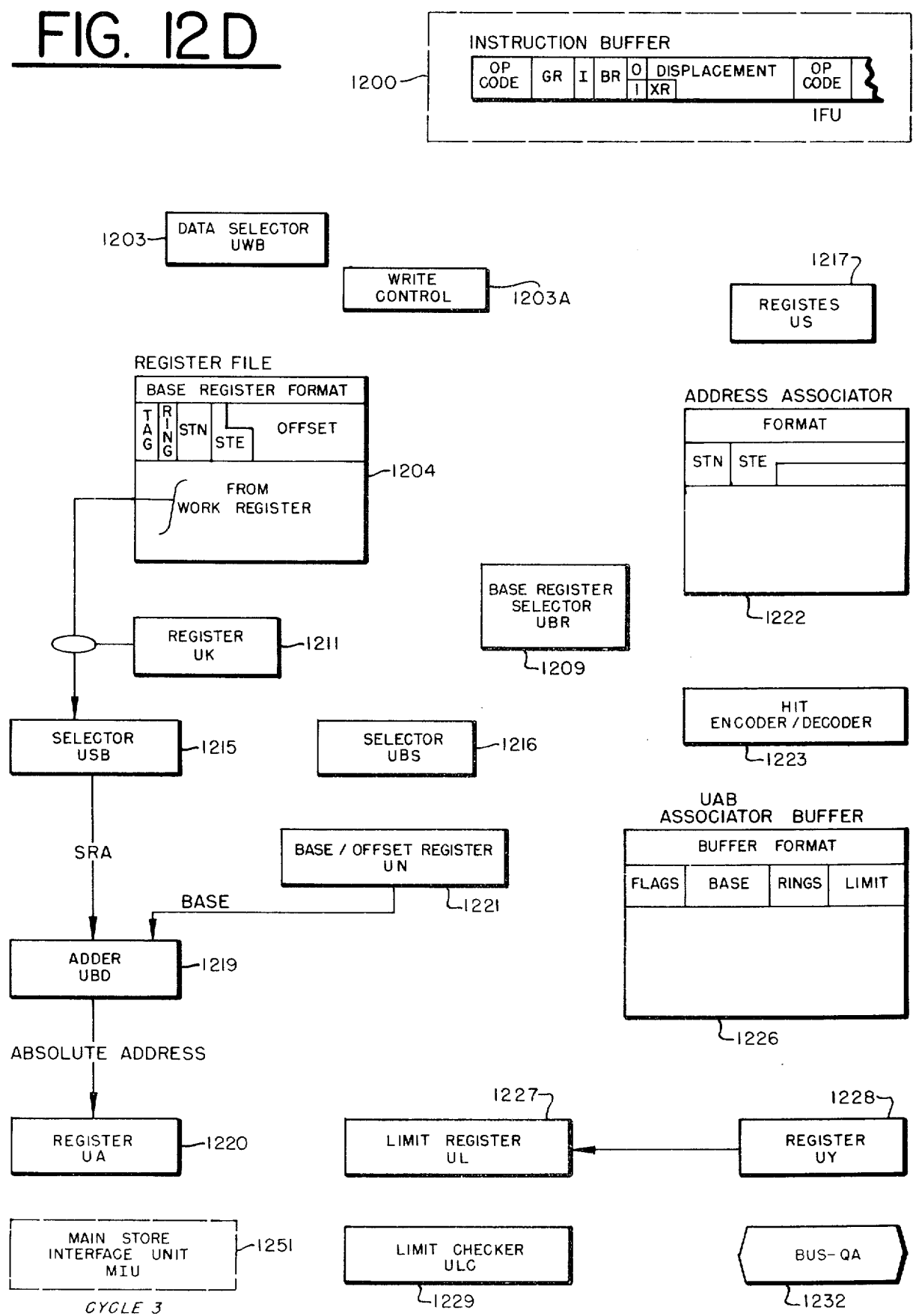

Cycle 3 (Hardware States of FIG. 12D)

a. The work register containing SRA is selected by UK register 1211 and SRA is transferred to the adder 1219 via USB selector 1215.

b. The segment descriptor base is transferred from base/offset register UN 1221 where it is added to SRA to produce the absolute address.

c. The absolute address is transferred to UA register 1220.

At the end of Cycle 3

1. The absolute address is located in UA register 1220.
2. The limit for the address is located in UL limit register 1227.

Figure 12E:
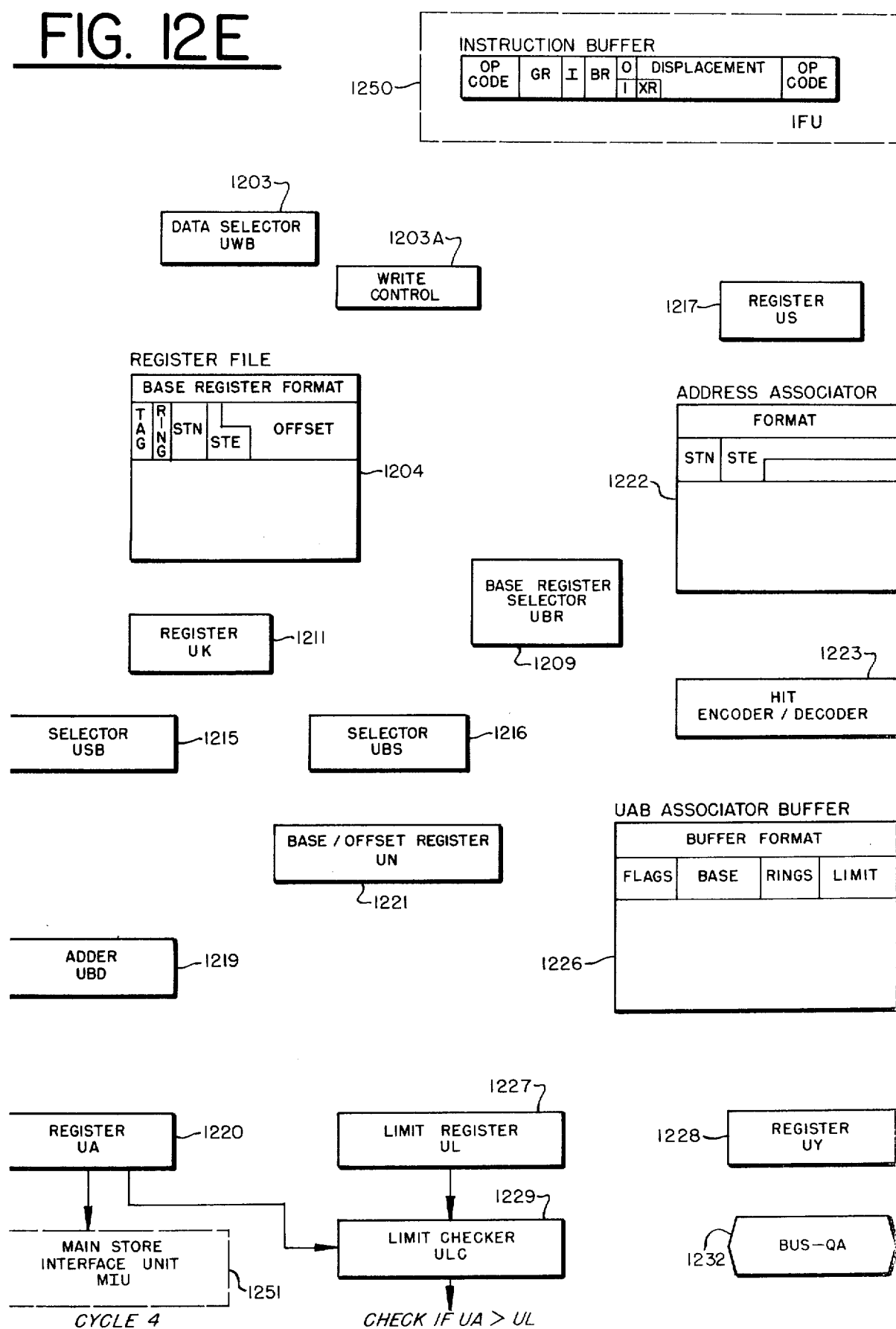

Cycle 4 (Hardware States of FIG. 12E)

a. Absolute address is sent to memory interface unit MIU (not shown) and to limit checker ULC 1229; MIU cycle begins.

b. Limit set in limit register 1227 is sent to UL limit checker 1129 where it is compared with the absolute address. If the address exceeds limit (i.e., contents UA UL) an upper limit check occurs and the MIU cycle started in Item a, above, is aborted. (The MIU cycle begins before the limit checking is finished in anticipation of a valid address. Since several cycles are required to access storage the operation can easily be aborted before data is disturbed abortion is accomplished by forming the MIU cycle into a read operation thereby preventing alternation of data in storage.)

Having shown and described four embodiments of the invention, those skilled in the art will realize that many variations and modifications can be made to produce the described invention and still be within the spirit and scope of the claimed invention.

| GLOSSARY OF TERMS | |
|---|---|
| JOB | - The job is the major unit of work for the batch user. It is the vehicle for describing, scheduling, and accounting for work he wants done. |
| JOB STEP | - A smaller unit of batch work. It is generally one step in the execution of a job consisting of processing that logically belongs together. |
| TASK | - The smallest unit of user-defined work. No user-visible concurrency of operation is permitted within a task. |
| PROGRAM | - A set of algorithms written by a programmer to furnish the procedural information necessary to do a job a part of a job. |
| PROCESS GROUP PLEX | - The system's internal representation of a specific execution of a job. |
| PROCESS GROUP | - A related set of processes, usually those necessary for performance of a single job step. |
| PROCESS | - The controlled execution of instructions without concurrency. Its physical representation and control are determined by internal system design or convention. |
| PROCEDURE | - A named software function or algorithm which is executable by a computational processor without concurrency. Its physical representation (code |

-continued

GLOSSARY OF TERMS

| | |
|---|---|
| | plus associated information, invocation, and use are determined by internal system or designed convention. |
| LOGICAL PROCESS | - The collection of hardware resources and control information necessary for the execution of a process. |
| ADDRESS SPACE (SEGMENTATION) | - The set of logical addresses that the CPU is permitted to transform into absolute addresses during a particular process. Although a processor has the technical ability of addressing every single cell of timing memory, it is desirable to restrict access only to those cells that are used during the process associated with the processor. |
| LOGICAL ADDRESS | - An element of the process address space such as for example segment number SEG and Displacement D. |
| BASIC ADDRESS DEVELOPMENT | - A hardware procedure which operates on a number of address elements to compute an absolute address which is used to refer to a byte location in core. |
| PROCESS CONTROL BLOCK | - A process control block PCB, is associated with each process and contains pertinent information about its associated process, including the absolute address of tables defining the segment tables the process may access. |
| J.P. TABLES | - A collection of logical addresses for locating a process control block associated with a process. |

We claim:

1. An apparatus for developing an absolute address for a selected operand within a selected one of a plurality of variable size segments within a memory space, said apparatus comprising:
   a. first means for storing a plurality of first addresses for identifying and locating said variable size segments within said memory space;
   b. second means for storing a plurality of second addresses for identifying said variable size segments and for providing an address of a first byte of said selected operand within said variable size segments;
   c. third means, coupled to said second means, for selecting one of said second addresses;
   d. fourth means, in said first means and coupled to said second and third means, for matching the variable segment of said selected one of said second addresses with one of the variable segments of said first addresses;
   e. fifth means, coupled to said first, second and third means and responsive to said fourth means, for adding said selected one of said second addresses to one of said first addresses whose segment matches the segment of said selected one of said second addresses; and,
   f. sixth means, coupled to said fifth means, for storing a third address of said selected operand said third address being the address of a selected byte in said operand relative to the first byte, and whereby said fifth means adds said third address to said first and second addresses to generate the absolute address of a byte within said selected operand.

2. The apparatus as recited in claim 1 wherein said first means further stores absolute address limits associated with the segments of each of said first addresses said absolute address, limits indicating the address beyond which the absolute address of its associated segment cannot go.

3. The apparatus as recited in claim 2 further including seventh means, coupled to said first and fifth means for comparing the absolute address of said selected operand to the absolute address limit of said selected one of a plurality of variable size segments in which said selected operand resides.

4. The apparatus as recited in claim 3 including eighth means, coupled to said seventh means, for inhibiting the addressing of said selected operand when said absolute address of said selected operand is greater than said absolute address limit of said selected one of said plurality of variable size segments.

5. An apparatus for developing an absolute address for a selected operand within a selected one of a plurality of variable size segments within the memory space, said apparatus comprising:
   a. first means for storing a plurality of segment descriptors, one each of said segment descriptors associated with one each of preselected ones of said plurality of variable size segments, each of said segment descriptors containing a base address of its associated segment within said memory space and said first means further containing a maximum address limit field for defining a maximum address limit of a segment associated with a segment descriptor;
   b. second means, coupled to said first means, for storing a plurality of segment numbers, one each of said segment numbers corresponding with one each of said preselected one of said segments having an associated segment descriptor stored in said first means;
   c. third means for storing the segment number of said selected one of said plurality of variable size segments located in said memory space;
   d. fourth means, in said second means and coupled to said third means, for matching said segment number in said third means with one of said plurality of segment numbers in said second means;
   e. fifth means for storing an offset address of said selected operand within said selected segment in said memory address space said offset address being the location of a first byte of said operand within said selective segment;
   f. sixth means, coupled to said first and fourth means, for storing the base address of a selected one of said preselected segments, said base address located in a descriptor stored in said first means, said descriptor's associated segment number having been matched with one of said segment numbers stored in said third means;

g. seventh means, coupled to said fifth and sixth means and responsive to said fourth means for adding said offset address in said fifth means with said base address in said sixth means, whereby the absolute address of said selected operand is generated; and, h. limit means, coupled to said first and seventh means for determining that the resulting address from said seventh means is less than the maximum address limit in said first means.

6. An apparatus as recited in claim 1 including eighth means, coupled to said seventh means, for storing a displacement address of said selected operand said displacement address being the address of a selected byte of said operand relative to the first byte of said operand, and whereby said seventh means adds said displacement address to said base and offset address to generate the absolute address of a byte within said operand.

7. The apparatus as recited in claim 6 including ninth means, coupled to said first means, for storing the maximum address limit of said selected one of said plurality of variable size segments.

8. The apparatus as recited in claim 7 including tenth means, coupled to said limit means, for inhibiting the addressing of said selected operand when said absolute address of said selected operand is greater than said maximum address of said selected one of a plurality of variable size segments.

* * * * *